United States Patent
Vadivelu et al.

(10) Patent No.: US 11,263,165 B2
(45) Date of Patent: Mar. 1, 2022

(54) APPARATUSES FOR PERIODIC UNIVERSAL SERIAL BUS (USB) TRANSACTION SCHEDULING AT FRACTIONAL BUS INTERVALS

(71) Applicant: INTEL CORPORATION, Santa Clara, CA (US)

(72) Inventors: Karthi R. Vadivelu, Folsom, CA (US); Abdul R. Ismail, Beaverton, OR (US); Nausheen Ansari, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 837 days.

(21) Appl. No.: 15/396,573

(22) Filed: Dec. 31, 2016

(65) Prior Publication Data

US 2018/0189224 A1 Jul. 5, 2018

(51) Int. Cl.
*G06F 13/42* (2006.01)
*G06F 13/40* (2006.01)

(52) U.S. Cl.
CPC ...... *G06F 13/4282* (2013.01); *G06F 13/4022* (2013.01); *Y02D 10/00* (2018.01)

(58) Field of Classification Search
CPC .................................................. G06F 13/4027
See application file for complete search history.

(56) References Cited

U.S. PATENT DOCUMENTS

| | | | | |
|---|---|---|---|---|
| 6,061,687 A * | 5/2000 | Wooten | ................. | G06F 13/102 |
| 7,409,471 B2 * | 8/2008 | Saito | ................. | G06F 13/4286 710/33 |
| 2008/0320241 A1 | 12/2008 | Dees et al. | | |
| 2010/0082872 A1 * | 4/2010 | Fleming | ................. | G06F 13/385 710/310 |
| 2011/0208892 A1 | 8/2011 | Meyers | | |
| 2012/0281704 A1 | 11/2012 | Butterworth et al. | | |

(Continued)

FOREIGN PATENT DOCUMENTS

WO 2007024444 A1 3/2007

OTHER PUBLICATIONS

International Preliminary Report on Patentability for Application No. PCT/US2017/63977, dated Jul. 11, 2019, 8 pages.

(Continued)

*Primary Examiner* — Henry Tsai
*Assistant Examiner* — Juanito Borromeo
(74) *Attorney, Agent, or Firm* — Nicholson De Vos Webster & Elliott LLP

(57) ABSTRACT

Apparatuses relating to periodic Universal Serial Bus (USB) transaction scheduling at fractional bus intervals are described. In one embodiment, an apparatus includes a receptacle to receive a plug of a first device and a second device; a transceiver circuit coupled to the receptacle; and a controller circuit to: switch between a first mode for a first class of data transfers and a second mode for a second class of data transfers, wherein the first class preempts the second class of data transfers, schedule a data transfer with the transceiver circuit for a first endpoint of the first device at a first service interval of a bus interval when in the first mode, and schedule a data transfer with the transceiver circuit for a second, different endpoint of the second device at a second service interval that is smaller than the first service interval when in the first mode.

24 Claims, 17 Drawing Sheets

(56) References Cited

U.S. PATENT DOCUMENTS

2013/0250972 A1 9/2013 Nalawadi et al.
2016/0285645 A1 9/2016 Kim et al.
2016/0350247 A1 12/2016 Howard et al.

OTHER PUBLICATIONS

International Search Report and Written Opinion for Application No. PCT/US2016/027542, dated Jul. 22, 2016, 9 pages.

* cited by examiner

1000

ELECTRICALLY COUPLING A SERIAL BUS RECEPTACLE OF A THIRD DEVICE TO A SERIAL BUS PLUG OF A FIRST DEVICE OR A SECOND DEVICE, WHEREIN A TRANSCEIVER CIRCUIT OF THE THIRD DEVICE IS COUPLED TO THE SERIAL BUS RECEPTACLE 1002

↓

SWITCHING A CONTROLLER CIRCUIT BETWEEN A FIRST MODE FOR A FIRST CLASS OF DATA TRANSFERS AND A SECOND MODE FOR A SECOND CLASS OF DATA TRANSFERS, WHEREIN THE FIRST CLASS OF DATA TRANSFERS IS TO PREEMPT THE SECOND CLASS OF DATA TRANSFERS 1004

↓

SCHEDULING A DATA TRANSFER WITH THE TRANSCEIVER CIRCUIT FOR A FIRST ENDPOINT OF THE FIRST DEVICE AT A FIRST SERVICE INTERVAL OF A BUS INTERVAL WHEN IN THE FIRST MODE 1006

↓

SCHEDULING A DATA TRANSFER WITH THE TRANSCEIVER CIRCUIT FOR A SECOND, DIFFERENT ENDPOINT OF THE SECOND DEVICE AT A SECOND SERVICE INTERVAL THAT IS SMALLER THAN THE FIRST SERVICE INTERVAL WHEN IN THE FIRST MODE 1008

FIG. 10

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | $V_{BUS}$ | CC1 | D+ | D- | SBU1 | $V_{BUS}$ | RX2- | RX2+ | GND |
| GND | RX1+ | RX1- | $V_{BUS}$ | SBU2 | D- | D+ | CC2 | $V_{BUS}$ | TX2- | TX2+ | GND |
| B12 | B11 | B10 | B9 | B8 | B7 | B6 | B5 | B4 | B3 | B2 | B1 |

| A12 | A11 | A10 | A9 | A8 | A7 | A6 | A5 | A4 | A3 | A2 | A1 |
|---|---|---|---|---|---|---|---|---|---|---|---|
| GND | RX2+ | RX2- | $V_{BUS}$ | SBU1 | D- | D+ | CC1 | $V_{BUS}$ | TX1- | TX1+ | GND |
| GND | TX2+ | TX2- | $V_{BUS}$ | CC2 ($V_{CONN}$) | | | SBU2 | $V_{BUS}$ | RX1- | RX1+ | GND |
| B1 | B2 | B3 | B4 | B5 | B6 | B7 | B8 | B9 | B10 | B11 | B12 |

APPARATUSES FOR PERIODIC UNIVERSAL SERIAL BUS (USB) TRANSACTION SCHEDULING AT FRACTIONAL BUS INTERVALS

TECHNICAL FIELD

The disclosure relates generally to electronics, and, more specifically, an embodiment of the disclosure relates to circuitry for periodic Universal Serial Bus (USB) transaction scheduling at fractional bus intervals

BACKGROUND

Electronics (e.g., computer systems) generally employ one or more electrical connections to facilitate the transmittal of data (e.g., communication) between devices, such as between a computing system and a (e.g., external) peripheral.

BRIEF DESCRIPTION OF THE DRAWINGS

The present disclosure is illustrated by way of example and not limitation in the figures of the accompanying drawings, in which like references indicate similar elements and in which:

FIG. 10 illustrates a flow diagram according to embodiments of the disclosure.

DETAILED DESCRIPTION

Figure 1:
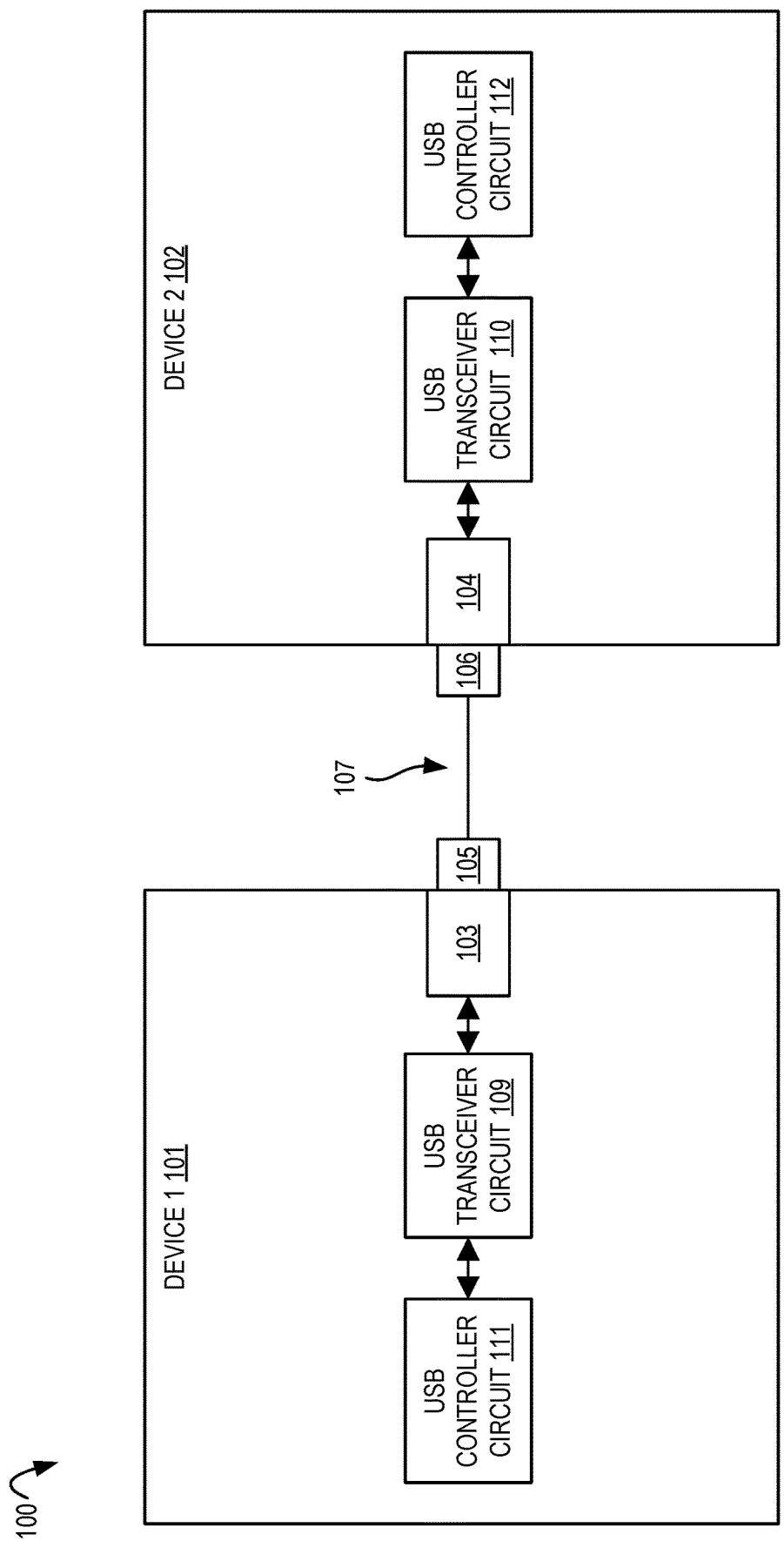
FIG. 1 illustrates a schematic diagram of a circuit including a first device coupled to a second device according to embodiments of the disclosure.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Electronics (e.g., computing systems) generally employ one or more electrical connections (e.g., wired or wireless connections) to facilitate the transmission and reception of data (e.g., communication) between devices, such as, but not limited to, between a computing system (e.g., a computer including a hardware processor) and a (e.g., external) peripheral. Non-limiting examples of peripherals are displays, external storage devices (e.g., hard disk drives), and mobile devices (e.g., smartphones and tablets).

Certain electrical couplings (e.g., connections) include parallel conductors (e.g., parallel wires or other electrically conductive paths). One embodiment of an electrical connection is a bus. One embodiment of a bus is a multiple conductor bus, for example, where the conductors (e.g., wires) allow parallel (e.g., concurrent) transmittal of data thereon. The term electrical connection (e.g., bus) may generally refer to one or more separate physical connections, communication lines and/or interfaces, shared connections, and/or point-to-point connections, which may be connected by appropriate bridges, hubs, adapters, and/or controllers. A serial bus (e.g., serial bus architecture) may generally refer to a (e.g., shared) communication channel that transmits data one bit after another (e.g., sequentially), for example, over a (e.g., each) single wire or fiber.

The phrase Universal Serial Bus (USB) generally refers to a specification(s) for a serial bus that supports the transmission and reception of data (e.g., and power and/or control) between a downstream facing port (e.g., a host) and a one or more upstream facing ports (e.g., devices), for example, through one or more hubs there between. In one embodiment, a USB specification is the USB 2.0 (e.g., USB2) specification released on Apr. 27, 2016 and Engineering Change Notices approved through Mar. 25, 2016. In one embodiment, a USB specification is the USB 3.1 specification released on Jul. 26, 2015 and Engineering Change Notices approved through Sep. 12, 2016. In one embodiment, a USB circuit (e.g., protocol layer thereof) communicates according to a protocol of a USB specification.

In certain embodiments, a first device may connect to a second device through a (e.g., wired or wireless) electrical connection, for example, a serial bus cable having multiple conductors (e.g., wires). A cable may include a plug, e.g., on each end thereof. A receptacle of a device (or a plug of a device) may receive a plug (or receptacle) coupled to another device.

FIG. 1 illustrates a schematic diagram 100 of a circuit including a first device 101 coupled to a second device 102 according to embodiments of the disclosure. Device 101 may be a host that generates viewable content (e.g., data frames) and device 2 may be a display to display the viewable content from the host. Depicted device 101 is (e.g., electrically and/or physically) coupled to device 102 through a cable 107, although other couplings may be utilized in other embodiments. Depicted device 101 includes a receptacle 103 coupled to its circuitry and depicted device 102 includes a receptacle 104 coupled to its circuitry, e.g., input and output (I/O) circuitry. Depicted cable 107 includes a (e.g., multiple parallel wire) conductor to transmit data between device 101 and device 102. Depicted cable 107 includes a first end with a plug 105 to removably couple to (e.g., slide into) receptacle 103 of device 101 and an opposite, second end with a plug 106 to removably couple to (e.g., slide into) receptacle 104 of device 102. Cable 107 may couple (e.g., electrically and physically) device 101 to device 102, e.g., to allow a transfer of data between (e.g., to and/or from) device 101 and device 102.

Depicted device 101 includes a (e.g., USB) transceiver circuit 109 (e.g., with a transmitter and/or receiver to transmit and receive data, respectively) coupled to (e.g., USB) receptacle 103. Device 101 further includes a (e.g., USB) controller circuit 111 coupled to transceiver circuit 109. Controller circuit 111 may control (e.g., schedule) data transmission and/or reception by the transceiver circuit 109 (e.g., with device 102). Depicted device 102 includes a (e.g., USB) transceiver circuit 110 (e.g., with a transmitter and/or receiver to transmit and receive data, respectively) coupled to (e.g., USB) receptacle 104. Device 102 further includes a (e.g., USB) controller circuit 112 coupled to transceiver circuit 110. Controller circuit 112 may control (e.g., schedule) data transmission and/or reception by the transceiver circuit 110 (e.g., with device 101).

Input/output (10) applications (e.g., a content generator and its display) may have data sinks that expect data from a bus at a fixed rate, e.g., with guarantees of access at a fixed periodicity. In certain embodiments, the periodicity of access to the bus dictates the buffer sizes that need to be implemented in the device(s), e.g., as well as minimum latency between data production and consumption. In one embodiment, a USB standard has a plurality of transfer types (e.g., four transfer types of control, interrupt, bulk, and isochronous) that determines the characteristics of the data flow between a (e.g., software) client and its function. A transfer may generally refer to one or more bus transactions to move information between a (e.g., software) client and its function.

In one embodiment, a bulk transfer is a USB transfer type that has guaranteed delivery, e.g., but not guaranteed bandwidth on the bus. In certain embodiments, a bulk type of transfer is preempted by other transfer types (e.g., periodic types) of traffic. A bulk transfer may provide lower latency in some cases when it is not preempted. In one embodiment, a periodic transfer (e.g., isochronous transfer and interrupt transfer of USB transfer types), is a USB transfer type that has guaranteed bandwidth, e.g., due to it being allowed to preempt any bulk type of transfers. A periodic transfer may be tightly scheduled. Latency may be higher in a periodic transfer, e.g., typically tied to the periodicity of the service interval. A fourth USB transfer type is a control transfer, e.g., where a control transfers supports configuration, command, and status types of communications between a client and a function.

In one embodiment, bulk transfers are non-periodic, large bursty communications typically used for a transfer that can use any available bandwidth and can also be delayed until bandwidth is available. In one embodiment, isochronous transfers provide periodic, continuous communication between a host and a device. In one embodiment, isochronous data is a stream of data whose timing is implied by its delivery rate. In one embodiment, an interrupt transfers have a bounded latency and are typically used to handle service needs. In one embodiment, control transfers supports configuration, command, and status types of communications between a client and a function.

In one embodiment, an endpoint (e.g., a device endpoint) is a uniquely addressable portion of a (e.g., USB) device that is the source or sink of information in a communication flow between the host and device. In one embodiment, an endpoint address is the combination of an endpoint number and an endpoint direction on a USB device. An endpoint number may be a four-bit value (e.g., between hexadecimal zero to F (e.g., binary 1111) associated with a particular endpoint on a USB device. An (e.g., each) endpoint address may support data transfer in one direction, where the direction may be either IN or OUT (e.g., IN refers to transfers to the host and OUT refers to transfers from the host). A bus interval may refer to the period that establishes the integral boundary of service intervals. A bus interval may be equivalent to the microframe interval (THSFRAM) defined in the USB 2.0 specification. A USB service interval may refer to an integral (e.g., integer) multiple of a bus interval within which a periodic endpoint is to (e.g., must) be serviced.

A USB specification may define a minimum service interval for periodic endpoints as one bus interval (e.g., also called a microframe). One bus interval may be about 125 microseconds (μs), e.g., 125+/−13.333 μs. This bus interval may require a certain level of buffering within a USB device, e.g., since the device may need to buffer up at least 125 μs worth of data, which may be fairly large for high bandwidth, periodic transfers from a device. Devices (e.g., display timing converters) may require periodic data flow, e.g., and are very cost sensitive. In addition, a bus interval being equal to a service interval (e.g., 125 μs) may impose a minimum latency on data transport.

As an example, when a USB device that has an isochronous endpoint is connected to a (e.g., host) controller, the host controller may reserve bandwidth for that endpoint and schedule transactions to the USB endpoint once every service interval, e.g., with the smallest service interval being 125 μs. In certain embodiments, a USB (e.g., host) controller is to reserve some bandwidth (e.g., about 10%) for bulk transfer types of data (e.g., packets) to avoid starvation of bulk data in the presence of (e.g., high bandwidth) periodic (e.g., isochronous) data transfers. In one embodiment, a periodic type of data transfer is required to be transmitted in the service interval required by the endpoint, but it may be transmitted anywhere within that service interval. Thus a device may implement sufficient buffering to deal with the worst case scenario.

Figure 2:
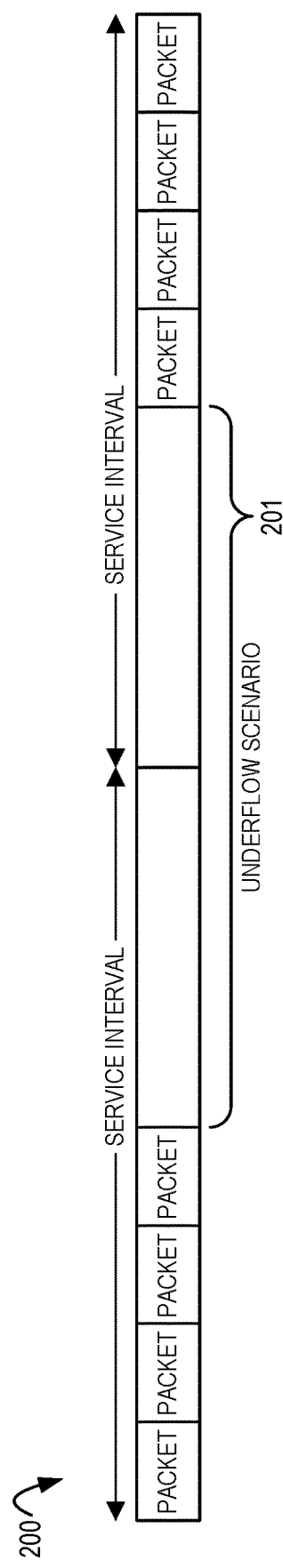
FIG. 2 illustrates a dataflow diagram of an underflow scenario for a periodic data transfer according to embodiments of the disclosure.
Figure 3:
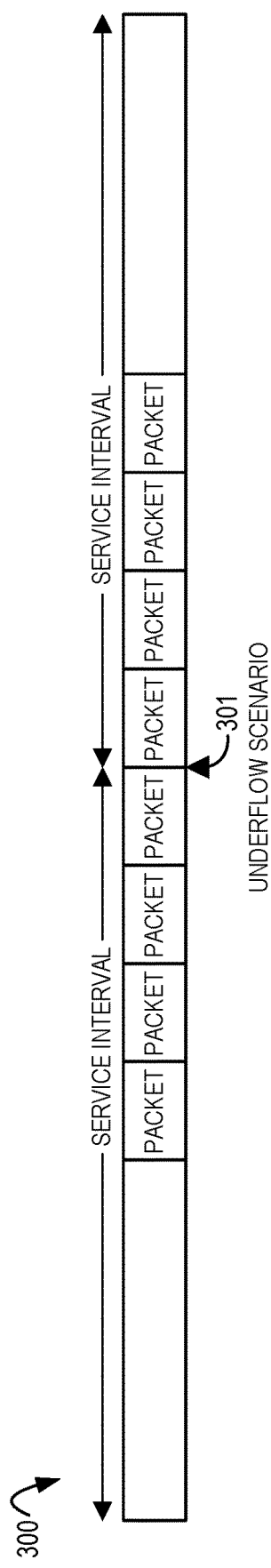
FIG. 3 illustrates a dataflow diagram of an overflow scenario for a periodic data transfer according to embodiments of the disclosure.
Figure 4:
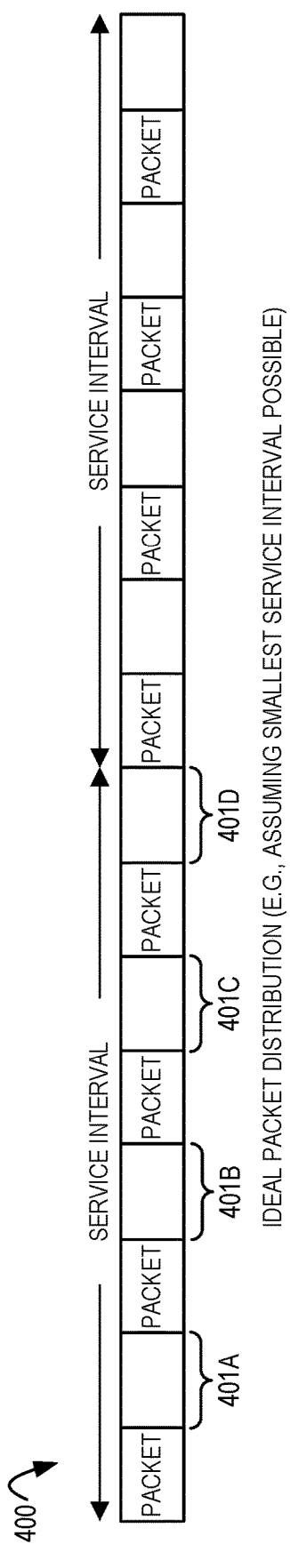
FIG. 4 illustrates a dataflow diagram of an ideal packet distribution scenario for a periodic data transfer according to embodiments of the disclosure.

Turning to FIGS. 2-4, FIG. 2 illustrates a dataflow diagram 200 of an underflow scenario for a periodic data transfer according to embodiments of the disclosure. Dataflow diagram 200 depicts two (e.g., identical) service intervals which are to have four data packets sent in each service interval of the period data transfer. FIG. 200 illustrates an underflow scenario for a periodic transfer where the first periodic data (e.g., packets) transfer occurring at the beginning of the first service interval and the second periodic data (e.g., packets) transfer occurring at the end of the subsequent, second service interval such that there is a maximum period of time 201 where no periodic transfers occur (e.g., bulk transfers may occur during time 201).

FIG. 3 illustrates a dataflow diagram 300 of an overflow scenario for a periodic data transfer according to embodiments of the disclosure. Dataflow diagram 300 depicts two (e.g., identical) service intervals which are to have four data packets sent in each service interval of the period data transfer. FIG. 300 illustrates an overflow scenario for a periodic transfer where the first periodic data (e.g., packets) transfer occurring at the end of the first service interval and the second periodic data (e.g., packets) transfer occurring at the beginning of the subsequent, second service interval such that there is a minimum period (e.g., zero) of time 301 where no periodic transfers occur (e.g., bulk transfers may occur during time 301).

FIG. 4 illustrates a dataflow diagram 400 of an ideal packet distribution scenario for a periodic data transfer according to embodiments of the disclosure. The term "ideal" may be in reference to a given buffer size in a device, e.g., in contrast to alleviating an underflow scenario or overflow scenario by increasing the buffer size (e.g., and cost) in the device. Dataflow diagram 400 depicts two (e.g., identical) service intervals which are to have four data packets sent in each service interval of the period data transfer. FIG. 400 illustrates an ideal periodic data (e.g., packet) distribution scenario such that the data packets are sent at uniform (e.g., evenly distributed) periods of time, e.g., each time (401A-401D) when there is no periodic data transfer is the same.

An endpoint (e.g., endpoint device) may alleviate this by choosing a smaller service interval (for example, instead of increasing the buffer size, e.g., and cost), but the current USB specifications do not schedule at time intervals (e.g., service intervals) smaller than a bus interval (e.g., 125 μs), for example, with this placing a lower bound on the buffering utilized in an endpoint. Certain embodiments herein provide for a service interval for periodic data transfers smaller than (e.g., a fraction of) a bus interval (e.g., 125 μs), for example, but does not change the service interval for other (e.g., bulk) data transfers. Certain embodiments herein change the definition of a USB service interval from only referring to an integral (e.g., integer) multiple of a bus interval within which a periodic endpoint is to (e.g., must) be serviced to additionally or alternatively refer to a fractional (e.g., fraction) multiple of a bus interval within which a periodic endpoint is to (e.g., must) be serviced. Certain embodiments herein reduce the service interval for isochronous USB transfers. Certain embodiments herein allow for a reduced size of buffer for data from a periodic transfer. Certain embodiments herein provide for a reduced service interval while guaranteeing service (e.g., not a bulk transfer where a bulk transfer may be preempted by periodic transfers). Certain embodiments herein utilized the serial bus, e.g., and not a dedicated (e.g., non-USB) link to move data, for example, a dedicated link that gives up the advantage of being able to share the link with other devices. Certain embodiments herein do not add a new class of bulk transport, e.g., that have better scheduling guarantees. Certain embodiments herein are higher priority data transfers (e.g., their data transmittal will stall other lower priority data transfers) than other data (e.g., bulk) transfers. Certain embodiments herein provide for a service interval that is at maximum a half of a USB specification bus interval. Certain embodiments herein provide for a service interval that is at maximum a third of a USB specification bus interval. Certain embodiments herein provide for a service interval that is at maximum a ¼ (a quarter), ⅕, ⅙, ⅐, ⅛, etc. of a USB specification bus interval. Scheduling a data transfer in a service interval may mean that the data transfer will occur within that service interval (e.g., time period), but as the service interval may be a longer time period than the time the data transfer takes to complete, the data transfer may occur somewhere (e.g., anywhere) within that service interval.

In one embodiment, a (e.g., host) (e.g., communications) controller (e.g., controller circuit) includes a transaction scheduler for tracking bus intervals as well as service intervals of each endpoint, and scheduling transactions at the appropriate time. Certain embodiments herein include a controller (e.g., a scheduler thereof) tracking a new (e.g., additional) interval, for example, a fraction (e.g., a power of two fraction) of a bus interval (this new interval may be referred to as a "nanoframe" in this disclosure) and schedule transactions based on the periodicity of this nanoframe.

Certain embodiments herein may include one or more of: (1) additional fields or values in the endpoint descriptor (e.g., such that the new endpoint descriptor has a different format than that listed in Table 1 below) of the device that utilizes this capability to report this requirement to the host, (2) a modification in the (e.g., host) controller to recognize this modified endpoint descriptor, (3) modifications in the (e.g., host) controller to implement the nanoframe or other disclosure herein, (4) modifications in the (e.g., device) controller to implement the nanoframe or other disclosure herein, and (5) modifications in a (e.g., host) software driver to recognize the new fields in a descriptor and communicate that information to the (e.g., host) controller. Certain embodiments herein allow devices to use isochronous transport and have a guarantee of smaller service intervals. In addition, certain embodiments herein are completely compatible with existing hubs and docks. Certain embodiments herein are compatible with existing USB hubs already in the market, e.g., by utilizing currently unused fields in an endpoint descriptor. Certain embodiments herein transmit data with a higher service priority than a bulk transfer (e.g., a bulk transfer device).

Figure 5:
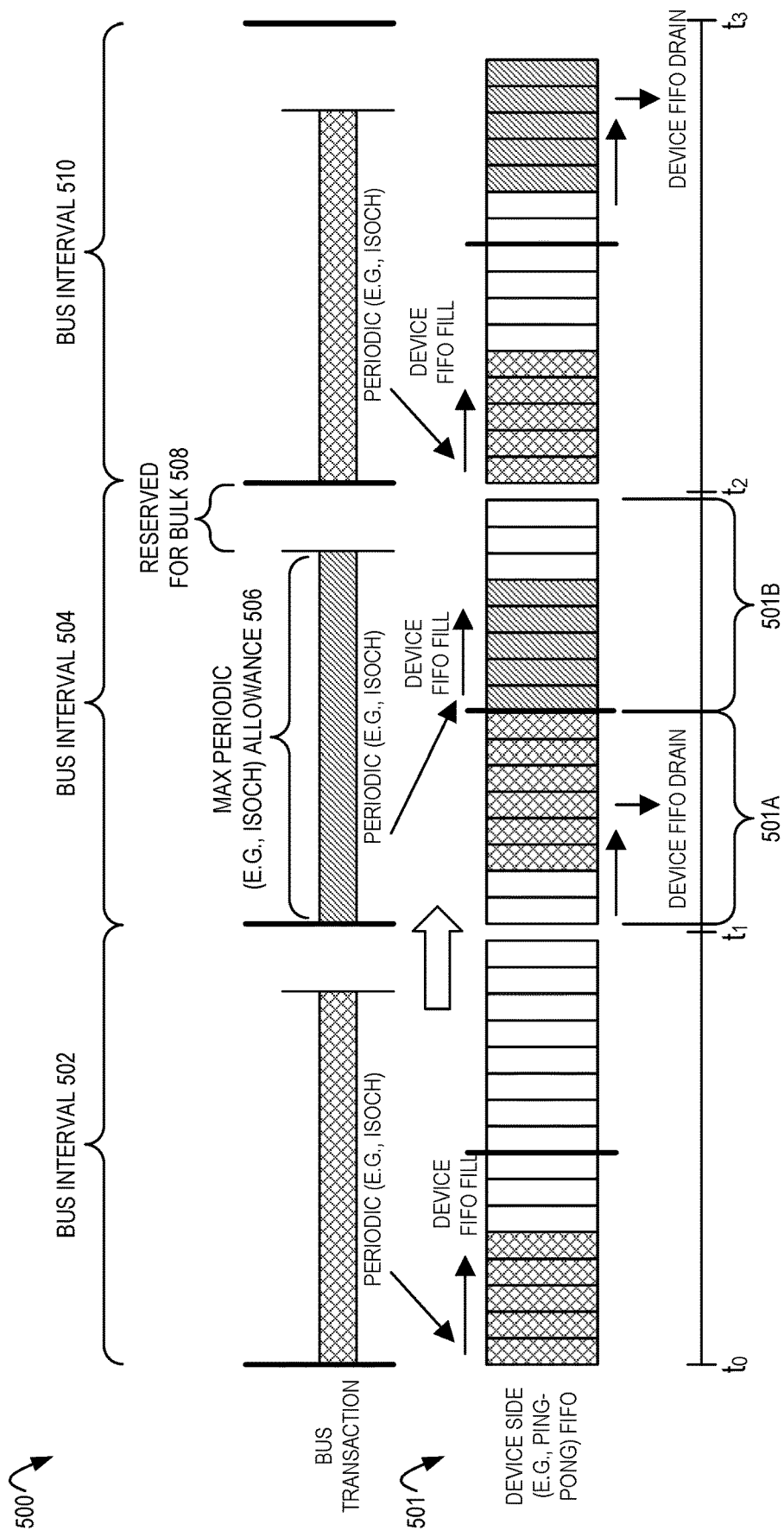
FIG. 5 illustrates a dataflow diagram for a periodic and bulk data transfer according to embodiments of the disclosure.

FIG. 5 illustrates a dataflow diagram 500 for a periodic and bulk data transfer according to embodiments of the disclosure. Dataflow diagram 500 includes three bus intervals (502, 504, 510). Each depicted bus interval includes a time period reserved (e.g., period 506 of bus interval 504) for a periodic transfer (e.g., isochronous transfer) and a time period reserved for a bulk transfer (e.g., period 508 of bus interval 504). Although the time period for a periodic transfer (e.g., period 506 of bus interval 504) and the time period for a bulk transfer (e.g., period 508 of bus interval 504) are shown as being back to back, the time periods may be in other scenarios (e.g., as in FIGS. 2-4). Certain embodiments herein define a service interval for a periodic transfer, but may also reserve some bandwidth (e.g., about 10%) for bulk transfer(s). As depicted, the smallest service interval for the periodic transfer is the bus interval (e.g., the highest frequency of service allowed) in this embodiment. FIG. 5 further includes a (e.g., first in, first out (FIFO) buffer 501 at various times ($t_0$-$t_1$, $t_1$-$t_2$, and $t_2$-$t_3$), which may be referred to as a ping-pong buffer, for example, where one part 501A of the buffer 501 is actively being consumed (e.g., data displayed by a display), while the other part 501B of the buffer 501 is being updated.

In one embodiment, a USB device with isochronous endpoint(s) advertises a service interval (e.g., time period), for example, and a maximum data transfer per service interval, for each endpoint, and this may cause the host to transfer to and/or from that device the specified amount of data per service interval time.

In FIG. 5, the device may have a buffer 501 per endpoint, e.g., which is sized to accommodate approximately twice the payload that it is to move during the service interval. Once the first part 501A (e.g., half) of the buffer has been filled, this may allow the device to sustain a continuous flow of data by allowing the device to process data in one part 501A (e.g., half) of the buffer 501 during a given service interval, while the host fills (e.g., for OUT endpoints) or drains (e.g., for IN endpoints) the data to or from the other part 501B (e.g., half) of the buffer 501. The size of this buffer may be directly proportional to the rate at which the endpoint processes data, e.g., as well as the duration of the service interval. In addition, the latency between production of data in the host and consumption of data in the device may increase with an increase in the size of this buffer.

Figure 6:
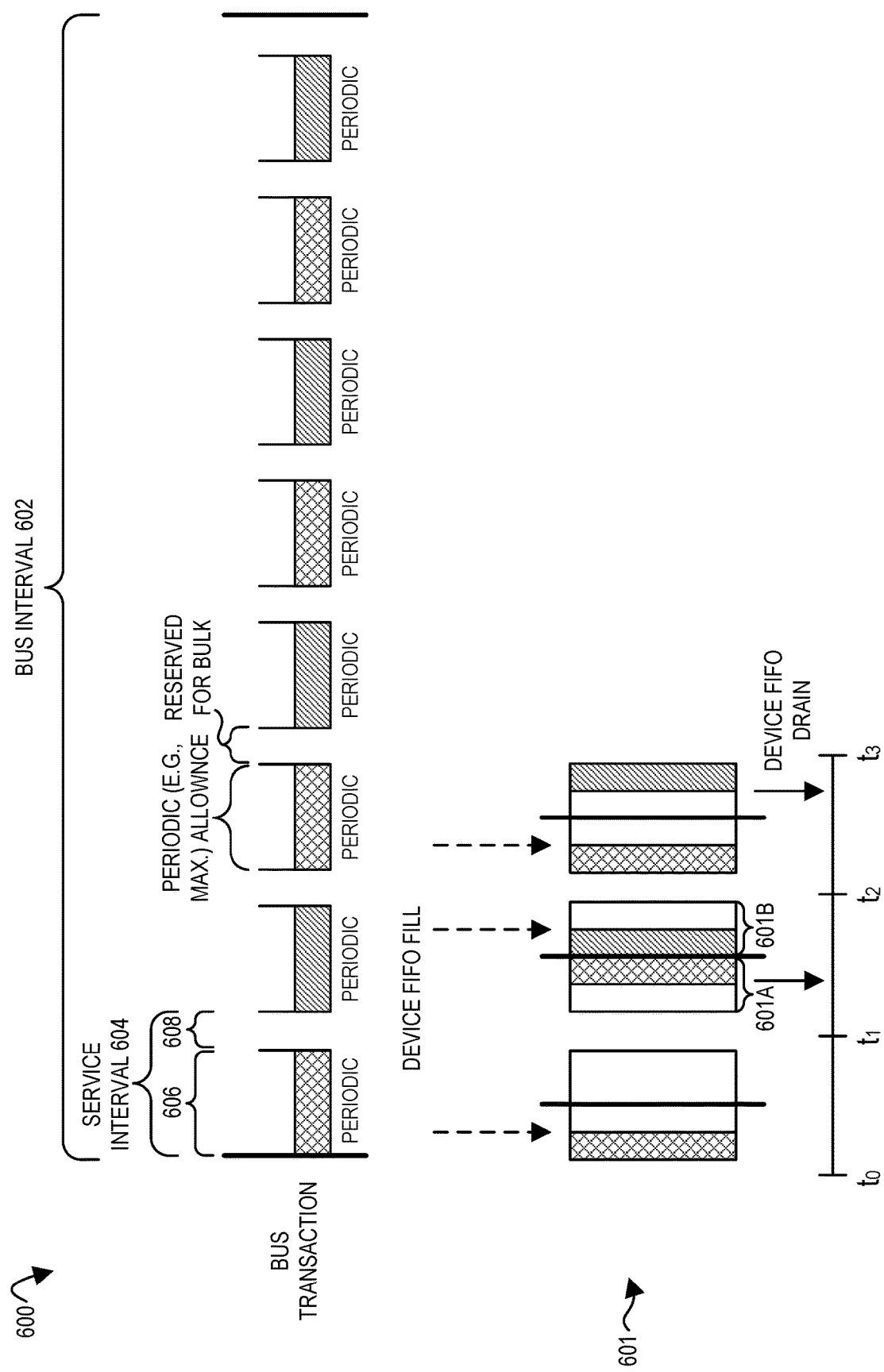
FIG. 6 illustrates a dataflow diagram for a periodic and bulk data transfer according to embodiments of the disclosure.

FIG. 6 illustrates a dataflow diagram 600 for a periodic and bulk data transfer according to embodiments of the disclosure. Dataflow diagram 600 includes one bus interval 602. Bus interval 602 may be the same bus interval(s) as in FIG. 5. Single bus interval 602 includes a plurality of service intervals (e.g., service interval 604). Depicted service intervals (e.g., service interval 604) include a time period (e.g., time period 606 of bus interval 604) reserved for a periodic transfer (e.g., isochronous transfer) and a time period (e.g., time period 608 of bus interval 604) reserved for a bulk transfer. Although the time period for a periodic transfer (e.g., period 606 of bus interval 604) and the time period for a bulk transfer (e.g., period 608 of bus interval 604) are shown as being back to back, the time periods may be in other scenarios (e.g., as in FIGS. 2-4). Certain embodiments herein define a service interval for a periodic transfer, but may also reserve some bandwidth (e.g., about 10%) for bulk transfer(s). As depicted, the smallest service interval for the periodic transfer is less than the bus interval in this embodiment. FIG. 6 further includes a (e.g., first in, first out (FIFO) buffer 601 at various times ($t_0$-$t_1$, $t_1$-$t_2$, and $t_2$-$t_3$), which may be referred to as a ping-pong buffer, for example, where one part 601A of the buffer 601 is actively being consumed (e.g., data displayed by a display), while the other part 601B of the buffer 601 is being updated. In FIG. 6, $t_0$-$t_1$, $t_1$-$t_2$, and $t_2$-$t_3$ are lesser times (e.g., shorter time periods) than in FIG. 5. Buffer 601 may be smaller than buffer 501 in FIG. 5 and the latency between production and consumption of data may be smaller.

Certain embodiments herein allow for (e.g., much) smaller endpoint buffers by guaranteeing a more uniform packet distribution within a bus interval. Certain embodiments here provide a (e.g., host) controller with a change of the smallest service interval (e.g., for scheduling) from one bus interval (e.g., microframe) to something smaller. For instance, into a unit that is ⅛th of a bus interval (e.g., a nanoframe). The denominator may be a power of 2, e.g., to make scheduling easier. Certain embodiments herein allow an endpoint to advertise a required service interval that is smaller than a bus interval, e.g., a service interval as one nanoframe. In one embodiment, a legacy endpoint that does not comprehend or need service intervals being smaller than bus intervals does not need to change, and thus continues to advertise its service interval requirement as a multiple (not a fraction) of a bus interval, to preserve legacy compatibility. Certain embodiments of a (e.g., host) controller (e.g., driver) may read and utilize (e.g., indicators of) this new service interval (e.g., for scheduling), e.g., and communicate the endpoint requirements correctly to the host controller. In one embodiment, legacy drivers and legacy (e.g., host) controllers will ignore the new capabilities that they do not comprehend. In certain embodiments, USB hubs do not require a change since there is no new protocol behavior, e.g., the increased frequency of transactions remain within the parameters of a USB specification (e.g., protocol). Certain embodiments herein may be utilized with a transport agnostic display protocol over a (e.g., single) USB connection or other USB display class over a (e.g., single) USB connection. In one embodiment, a USB connection utilizing the receptacles and plugs to connect one device to another device discussed in reference to FIGS. 11-14 below. In one embodiment, a (e.g., display) host controller according to this disclosure is to share its (e.g., single) (e.g., USB) connection with more than one client (e.g., device), for example, to allow display from different devices (e.g., that have different service intervals).

Next are examples of fractional (e.g., nanoframe) scheduling rules. In one embodiment, the new service interval ("nanoframe") is ⅛ of the current USB bus interval (e.g., called a microframe, which is 125 μs, such that a nanoframe is 15.625 μs). Within this nanoframe, the maximum amount of isochronous transfer allowed may be set to 12 maximum sized packets (e.g., for USB 3.1 generation 2 transaction) and 6 maximum sized packets (e.g., for USB 3.1 generation 1 transactions) per nanoframe. In one embodiment, this allocates a little over 12 μs for Isochronous transfers and the remaining (about 3.6 μs) for bulk transfers, e.g., which allows either 1 (USB 3.1 generation (Gen) 1 speed) or 2 (USB 3.1 Gen 2 speed) maximum sized packets of bulk transfers. This may keep the ratio of Isochronous data to Bulk data approximately the same as a non-fractional service interval (e.g., in FIG. 5) and preserve the total isochronous transfer per bus interval, e.g., 48 data packets for Gen 1 speed USB3.1) or 96 data packets (for higher, Gen 2 speed USB3.1) maximum sized packets (e.g., of 1024 bytes of data payload). In one embodiment, Gen 1 speed is about 5 Gbps and 8b/10b line encoding and Gen 2 speed is 10 Gbps and 128b/132b line encoding.

In certain embodiments, a (e.g., USB) device is to enumerate its endpoint capabilities. In one embodiment, a (e.g., USB) device indicates its capabilities (e.g., to a second device (host)) by grouping each set of related capabilities into an interface, and reporting all endpoints related to that interface. Multiple variations of a given capability may be reported as different interfaces, e.g., to allow for endpoints to report different requirements/capabilities for each interface. An endpoint may indicate its capabilities and requirements via an endpoint descriptor (e.g., data structure) which it reports (e.g., to a host controller) during standard enumeration. The endpoint descriptor may indicate the desired service interval using the bInterval field in an endpoint descriptor. An endpoint descriptor may have first indicator (e.g., to indicate the transfer type, such as bits 1-0 of bmAttributes field in Table 1 below) and second indicator (e.g., to indicate the transfer is a fractional (e.g., nanoframe) scheduling and not an integer scheduling). Certain embodiments herein modify an endpoint descriptor to allow for communication of (e.g., periodic) transfer internals that are fractions (e.g., not multiples) of the bus interval. In one embodiment, in order to ensure interoperability with legacy hosts, a device that requires support for fractional (e.g., nanoframe) bus interval scheduling reports at least one interface that advertises legacy (e.g., bInterval) values. Table 1 below discusses an example endpoint descriptor format (e.g., fields).

TABLE 1

Endpoint Descriptor Example Format

| Offset | Field | Size (bytes) | Value | Description |
|---|---|---|---|---|
| 0 | bLength | 1 | Number | Size of this descriptor in bytes |
| 1 | bDescriptorType | 1 | Constant | ENDPOINT Descriptor Type |
| 2 | bEndpointAddress | 1 | Endpoint | The address of the endpoint on the device described by this descriptor. The address is encoded as follows:<br>Bit 3 . . . 0: The endpoint number<br>Bit 6 . . . 4: Reserved, reset to zero<br>Bit 7: Direction, ignored for<br>  control endpoints<br>    0 = OUT endpoint<br>    1 = IN endpoint |
| 3 | bmAttributes | 1 | Bitmap | This field describes the endpoint's attributes when it is configured using the bConfigurationValue.<br>Bits 1..0: Transfer Type<br>  00 = Control<br>  01 = Isochronous<br>  10 = Bulk<br>  11 = Interrupt<br>If an interrupt endpoint, bits 5 . . . 2 are defined as follows:<br>  Bits 3 . . . 2: Reserved<br>  Bits 5 . . . 4: Usage Type<br>    00 = Periodic<br>    01 = Notification<br>    10 = Reserved<br>    11 = Reserved<br>If isochronous, they are defined as follows:<br>  Bits 3..2: Synchronization Type<br>    00 = No Synchronization<br>    01 = Asynchronous<br>    10 = Adaptive<br>    11 = Synchronous<br>  Bits 5..4: Usage Type<br>    00 = Data endpoint<br>    01 = Feedback endpoint<br>    10 = Implicit feedback Data endpoint<br>    11 = Reserved<br>If not an isochronous or interrupt endpoint, bits 5 . . . 2 are reserved and shall be set to zero.<br>All other bits are reserved and shall be reset to zero. Reserved bits shall be ignored by the host. |
| 4 | wMaxPacketSize | 2 | Number | Maximum packet size this endpoint is capable of sending or receiving when this configuration is selected.<br>For control endpoints this field shall be set to 512.<br>For bulk endpoint types this field shall be set to 1024.<br>For interrupt and isochronous endpoints this field shall be set to 1024 if this endpoint defines a value in the bMaxBurst field greater than zero. If the value in the bMaxBurst field is set to zero then this field can have any value from 0 to 1024 for an isochronous endpoint and 1 to 1024 for an interrupt endpoint. |
| 6 | bInterval | 1 | Number | Interval for servicing the endpoint for data transfers. Expressed in 125-μs units.<br>For Enhanced SuperSpeed isochronous and interrupt endpoints, this value shall be in the range from 1 to 16. However, the valid ranges are 8 to 16 for Notification type Interrupt endpoints. The bInterval value is used as the exponent for a $2^{(bInterval-1)}$ value; e.g., a bInterval of 4 means a period of 8 ($2^{(4-1)} \rightarrow 2^3 \rightarrow 8$).<br>This field is reserved and shall not be used for Enhanced SuperSpeed bulk or control endpoints. |

In certain embodiments herein, a (e.g., reserved) field from Table 1 may be used to indicate the endpoint descriptor is for a data transfer that has service interval in a fractional (e.g., nanoframe) bus interval, instead of multiples (e.g., microframes) of bus interval. For example, the bmAttributes field (e.g., bit [7] or bit [6]) may be set to indicate that the value in bInterval represents the service interval in a fractional (e.g., nanoframe) bus interval, instead of multiples (e.g., microframes) of bus interval. Certain embodiments herein redefine bInterval to indicate that the value is interpreted as multiples of nanoframes, e.g., when bmAttributes (e.g., field [7]) is set to 1. In an interface that utilizes service interval in a fractional (e.g., nanoframe) bus interval, the endpoint descriptor may indicate the service interval in multiples of nanoframes and in the case where legacy service intervals are needed, the bit in the bmAttributes would be set (e.g., cleared) to indicate that the service intervals in bInterval retain the definition of being a multiple (e.g., microframes) of the bus interval.

Figure 7:
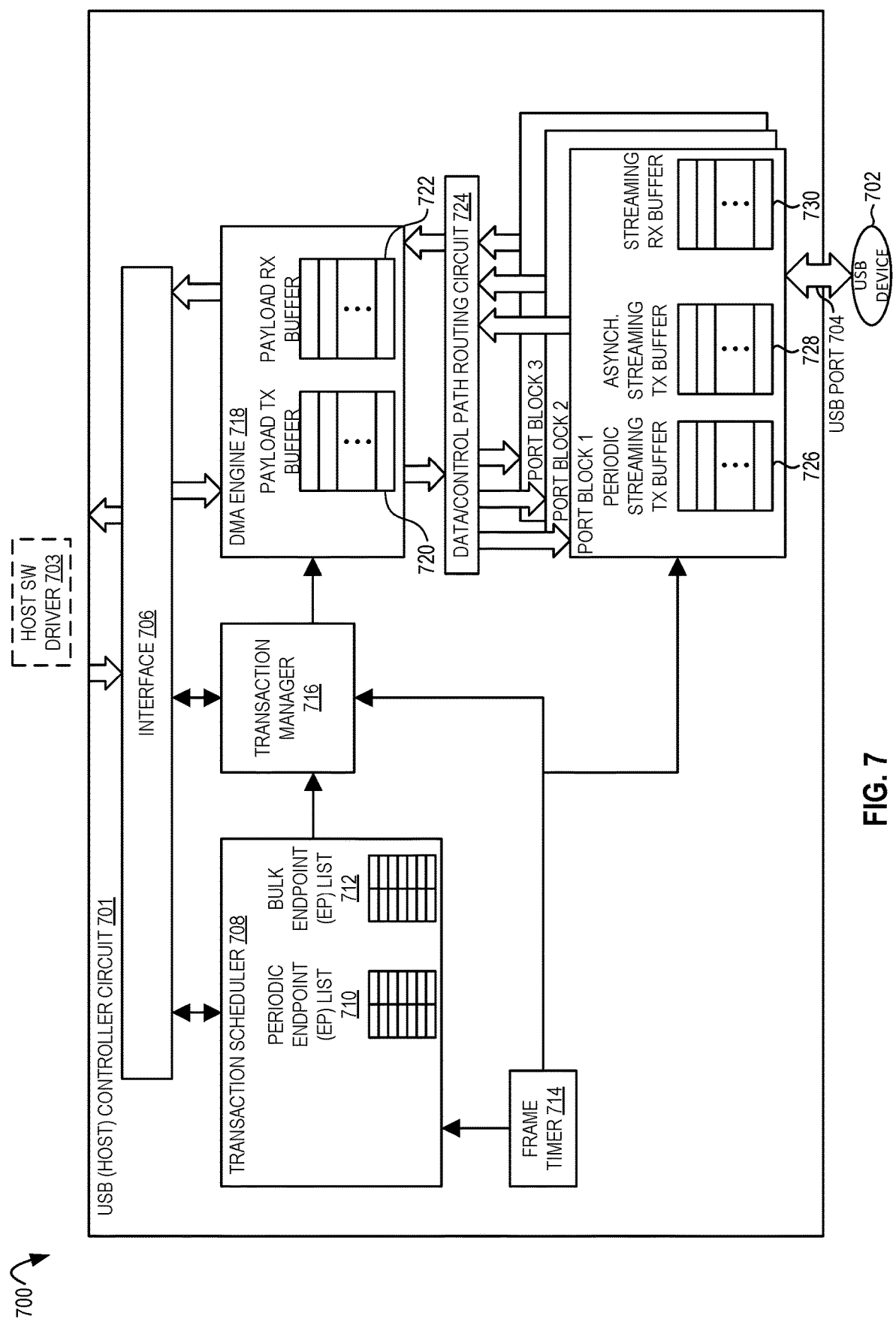
FIG. 7 illustrates a schematic diagram of a USB controller circuit according to embodiments of the disclosure.

FIG. 7 illustrates a schematic diagram 700 of a USB (e.g., host) controller circuit 701 according to embodiments of the disclosure. Depicted USB controller circuit 701 is coupled to USB device 702 through a USB connection 704 (e.g., port). USB controller circuit 701 includes a (e.g., fabric) interface 706, e.g., to connect to a memory and/or processor (e.g., CPU). Transaction scheduler 708 is to maintain a data structure (e.g., list) for the periodic 710 endpoints and bulk 712 (e.g., asynchronous) endpoints (e.g., of device 702), along with their attributes (such as their particular required service interval, total transfer size per service interval, etc.). Transaction scheduler 708 tracks the frame time (e.g., with frame timer 714) and schedules transactions according to the right priority and service interval requirements. Transaction manager 716 is to set up the transactions by fetching (e.g., endpoint) descriptors and tracking various phases of the transaction (e.g., Descriptor fetch, (USB) bus transfer, payload direct memory access (DMA), etc.). Direct memory access (DMA) engine 718 is to perform the data movement once the transaction has been setup, and may include buffer (e.g., transmission (TX) buffer 720 and receiver (RX) buffer 722) to allow for latency management. The port blocks (e.g., 1-3, but any one or plurality may be utilized) is instantiated by data/control path routing circuit 724 per supported USB port (e.g., port at 704) and may instantiate dedicated streaming buffers (e.g., periodic transfer streaming TX buffer 726, bulk transfer streaming TX buffer 728, and streaming RX buffer 730) for periodic and bulk (e.g., asynchronous) data packets. Controller circuit 701 may include a transceiver circuit, e.g., coupled to port block(s). Controller circuit 701 may communicate with optional host software (sw) driver 703, for example, with host driver controlling some function (s) of controller circuit 701.

Certain embodiments herein allow a device to operate at service intervals that are smaller than a bus interval (e.g., a USB defined bus interval), as well as updated (e.g., endpoint) descriptors to describe this capability. Certain embodiments herein provide a (e.g., USB) (e.g., host) controller to understand (e.g., utilize) a new range of service intervals disclosed herein, and the ability to schedule transactions at these smaller service intervals. Certain embodiments herein provide for changes to hardware, software, and firmware to provide and utilize new (e.g., portions of) descriptors, and optionally feed data into the host controller at smaller granularities.

Figure 8:
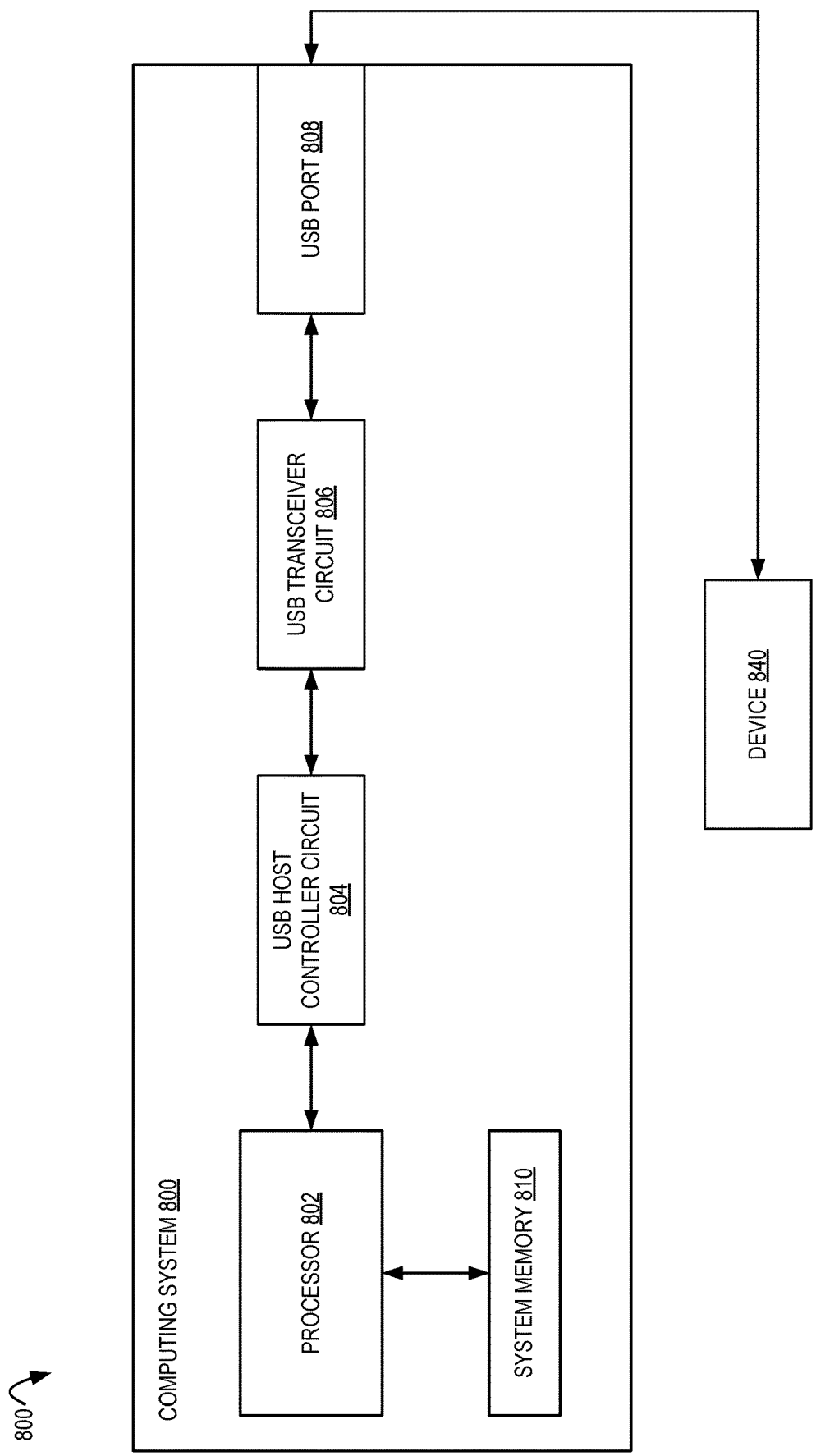
FIG. 8 illustrates a schematic diagram of a computing system coupled to a device according to embodiments of the disclosure.

FIG. 8 illustrates a schematic diagram of a computing system 800 coupled to a device 840 according to embodiments of the disclosure. Depicted computing system 800 includes a hardware processor 802 coupled to a system memory 810 and a USB host controller circuit 804. A USB host may include one or more of the controller 804, transceiver circuit 806, and port 808. In one embodiment, a host controller 804 is separate from (e.g., external to) a transceiver circuit 806 (e.g., PHY). USB port 808 may provide a connection (e.g., via a USB cable) to device 840. Although not depicted, device 840 may include a transceiver circuit, host controller circuit, and/or port, for example, as discussed in reference to FIGS. 1 and 9. In one embodiment, controller circuit 804 includes one or more of the components discussed above. For example, a controller circuit includes one or more of the components in FIG. 7. A computing system may include any or all of the depicted components.

Figure 9:
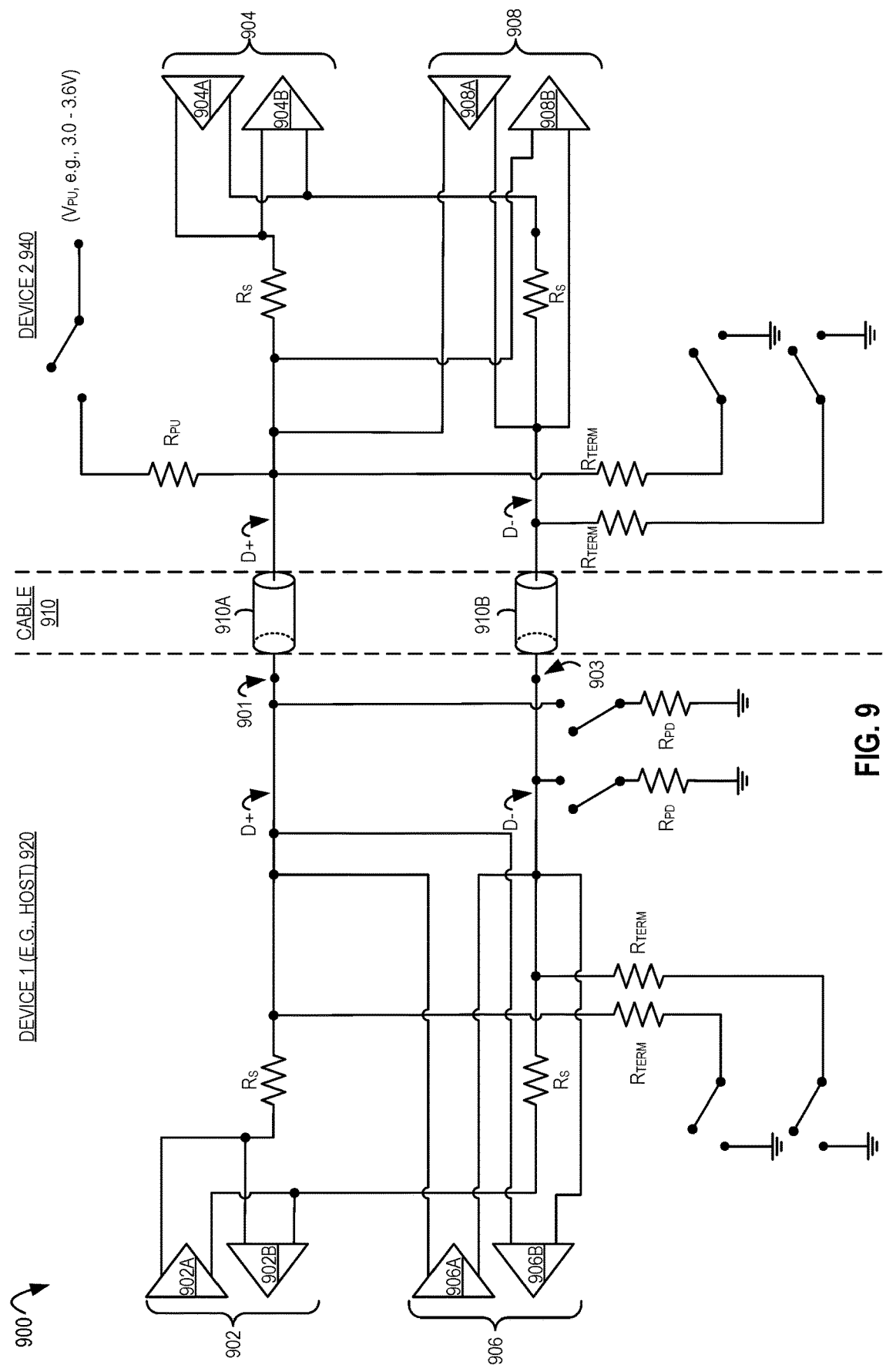
FIG. 9 illustrates a schematic diagram of a USB transceiver circuits according to embodiments of the disclosure.

FIG. 9 illustrates a schematic diagram of USB transceiver circuits (902, 904, 906, 908) according to embodiments of the disclosure. In one embodiment, device 920 is a host (and includes the depicted transceiver circuit(s)) and the connected device is device 940 (and includes the depicted transceiver circuit(s)). More particularly, FIG. 9 illustrates a schematic diagram of a circuit 900 including host 920 (e.g., a bus host) coupled to a device 940 (e.g., a bus device) through a cable 910 according to embodiments of the disclosure. The dotted lines indicating the cable 910, host 120, and device 140 portions of the circuit are merely examples and various components (e.g., switches, resistors, amplifiers, etc.) may be included in each portion and/or other portions. In the depicted embodiment in FIG. 9, the host 920 is coupled to the device 940 via cable 910. Depicted cable 910 includes a first conductor 910A to form a first data path between the host 920 and device 940 and a second conductor 910B to form a second data path between the host 920 and device 940. Although two conductors (e.g., signaling pairs) are depicted in cable 910, other conductors may be utilized, e.g., a ground and/or power (e.g., Vsus). In FIG. 9, the first data path through 910A is the positive data path (e.g., D+) and the second data path is the negative data path (e.g., D−) which together D+ and D− may be referred to as a USB 2.0 differential pair. In certain embodiments herein, a data path(s) between a host and a device may be utilized for other signals, e.g., for signal(s) from the USB 3.0 or 3.1 specifications. In one embodiment, a first data path (e.g., for D+) and a second data path (e.g., for D−) have the same data transfer rate (e.g., speed). Receptacle may connect at points 901 and 903.

In the depicted embodiment in FIG. 9, host 920 includes a first transceiver circuit 902 including a driver 902A and receiver 902B to respectively send and receive data, e.g., at or up to a first data rate. In the depicted embodiment in FIG. 9, device 940 includes a first transceiver circuit 904 including a driver 904A and receiver 904B to respectively send and receive data, e.g., at or up to a first data rate. In one embodiment, a first data rate includes low-speed (e.g., 1.5 Mbps) and/or full-speed (e.g., 12 Mbps) data transfer rates.

In the depicted embodiment in FIG. 9, host 920 includes a second transceiver circuit 906 including a driver 906A and receiver 906B to respectively send and receive data, e.g., at a second data rate. In the depicted embodiment in FIG. 9, device 940 includes a second transceiver circuit 908 including a driver 908A and receiver 908B to respectively send and receive data, e.g., at or up to a second data rate. In one embodiment, a second data rate includes high-speed (e.g., 480 Mbps) data transfer rates. A driver may be a constant voltage or constant current source. An Rs generally refers to a series damping resistor. An RTES generally refers to a termination resistance (e.g., having a resistance of 40.5 ohms to 49.5 ohms or 45 ohms). In one embodiment, an $R_{TERM}$ includes $R_S$. In one embodiment, $R_{TERM}$ is 45 ohms. An $R_{PU}$ generally refers to a (e.g., weak) pull-up resistor (e.g., having a resistance of 900 ohms to 1575 ohms or 1500 ohms). An $R_{PD}$ generally refers to a pull-down resistor (e.g., having a resistance of 14.25 kilo ohms to 24.8 kilo ohms or 15 kilo ohms). Although the switches in FIG. 9 are illustrated in an open position (e.g., as opposed to a closed (completed electrical connection) position), each may be open or closed as desired. For example, switches, receivers, and/or transmitters may be controlled by a control circuit (not depicted). Control circuit may be a controller (for example, an external controller, e.g., external to the transceiver circuit and/or to the physical layer (PHY)), e.g., a USB controller. In certain embodiments, a control circuit (e.g., USB controller(s)) may test that the host and device are to operate at (e.g., up to) a data transfer rate value before operating at that value. For example, a USB host and a USB device may perform a USB high-speed (e.g., HS Chirp K) detection handshake between the USB host and the USB device to indicate that each supports high-speed data transfer rates. The depicted host 920 and device 940 may illustrate a portion of the circuitry of each, for example, a host and/or a device may include other components that are not depicted, e.g., the control inputs and data outputs of the receivers and drivers.

FIG. 10 illustrates a flow diagram 1000 according to embodiments of the disclosure. Flow diagram 1000 includes electrically coupling a serial bus receptacle of a third device to a serial bus plug of a first device or a second device, wherein a transceiver circuit of the third device is coupled to the serial bus receptacle 1002; switching a controller circuit between a first mode for a first class of data transfers and a second mode for a second class of data transfers, wherein the first class of data transfers is to preempt the second class of data transfers 1004; scheduling a data transfer with the transceiver circuit for a first endpoint of the first device at a first service interval of a bus interval when in the first mode 1006; and scheduling a data transfer with the transceiver circuit for a second, different endpoint of the second device at a second service interval that is smaller than the first service interval when in the first mode 1008.

FIGS. 11-14 below discuss embodiments of receptacles and plugs to connect one device to another device. Table 2 that follows depicts embodiments of channels (e.g., conductors) to allow signals to flow between multiple devices.

TABLE 2

Example Communication Channels

| Pin | Signal Name | Description | Mating Sequence | Pin | Signal Name | Description | Mating Sequence |
|---|---|---|---|---|---|---|---|
| A1 | GND | Ground return | First | B12 | GND | Ground return | First |
| A2 | SSTXp1 | Positive half of first (e.g., SuperSpeed) transmitter (TX) differential pair of a first type | Second | B11 | SSRXp1 | Positive half of first (e.g., SuperSpeed) receiver (RX) differential pair of the first type | Second |
| A3 | SSTXn1 | Negative half of first (e.g., SuperSpeed) TX differential pair of the first type | Second | B10 | SSRXn1 | Negative half of first (e.g., SuperSpeed) RX differential pair of the first type | Second |
| A4 | VBUS | Bus Power | First | B9 | VBUS | Bus Power | First |
| A5 | CC1 | Configuration Channel | Second | B8 | SBU2 | Sideband Use (SBU) | Second |
| A6 | Dp1 | Positive half of a second type (e.g., USB 2.0) of differential pair - Position 1 | Second | B7 | Dn2 | Negative half of the second type (e.g., USB 2.0) of differential pair - Position 2 | Second |
| A7 | Dn1 | Negative half of the second type (e.g., USB 2.0) of differential pair - Position 1 | Second | B6 | Dp2 | Positive half of the second type (e.g., USB 2.0) of differential pair - Position | Second |
| A8 | SBU1 | Sideband Use (SBU) | Second | B5 | CC2 | Configuration Channel | Second |
| A9 | VBUS | Bus Power | First | B4 | VBUS | Bus Power | First |
| A10 | SSRXn2 | Negative half of second (e.g., SuperSpeed) RX differential pair of the first type | Second | B3 | SSTXn2 | Negative half of second (e.g., SuperSpeed) TX differential pair of the first type | Second |

TABLE 2-continued

Example Communication Channels

| Pin | Signal Name | Description | Mating Sequence | Pin | Signal Name | Description | Mating Sequence |
|---|---|---|---|---|---|---|---|
| A11 | SSRXp2 | Positive half of second (e.g., SuperSpeed) RX differential pair of the first type | Second | B2 | SSTXp2 | Positive half of second (e.g., SuperSpeed) TX differential pair of the first type | Second |
| A12 | GND | Ground return | First | B1 | GND | Ground return | First |

Figure 11:
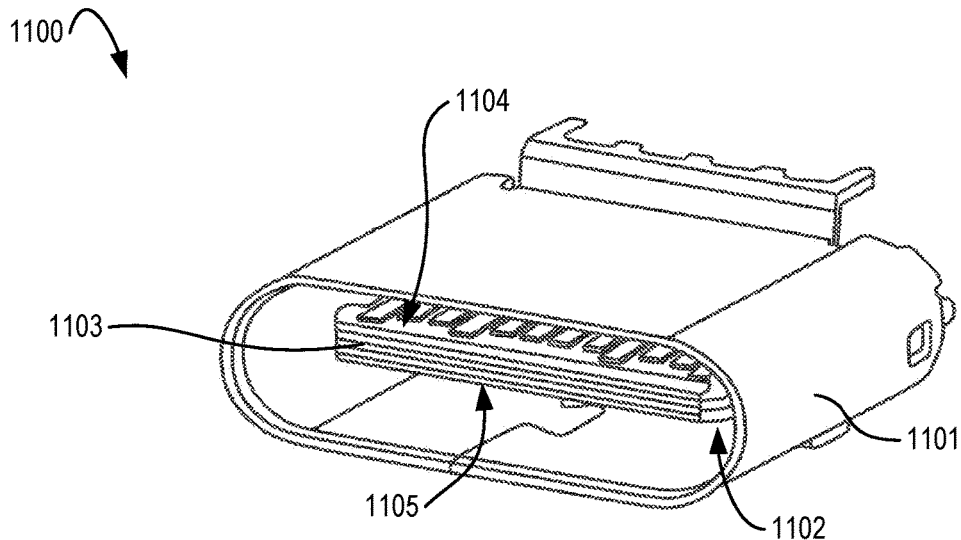
FIG. 11 illustrates a perspective view of a serial bus receptacle according to embodiments of the disclosure.

FIG. 11 illustrates a perspective view of a serial bus receptacle 1100 according to embodiments of the disclosure. In certain embodiments, serial bus receptacle 1100 may be part of (e.g., within) a device (e.g., mounted to a circuit board of a device).

Figure 12:
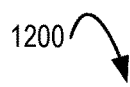
FIG. 12 illustrates a schematic diagram of the pins of a serial bus receptacle according to embodiments of the disclosure.

FIG. 12 illustrates a schematic diagram 1200 of the pins of a serial bus receptacle (e.g., serial bus receptacle 1100) according to embodiments of the disclosure.

Figure 13:
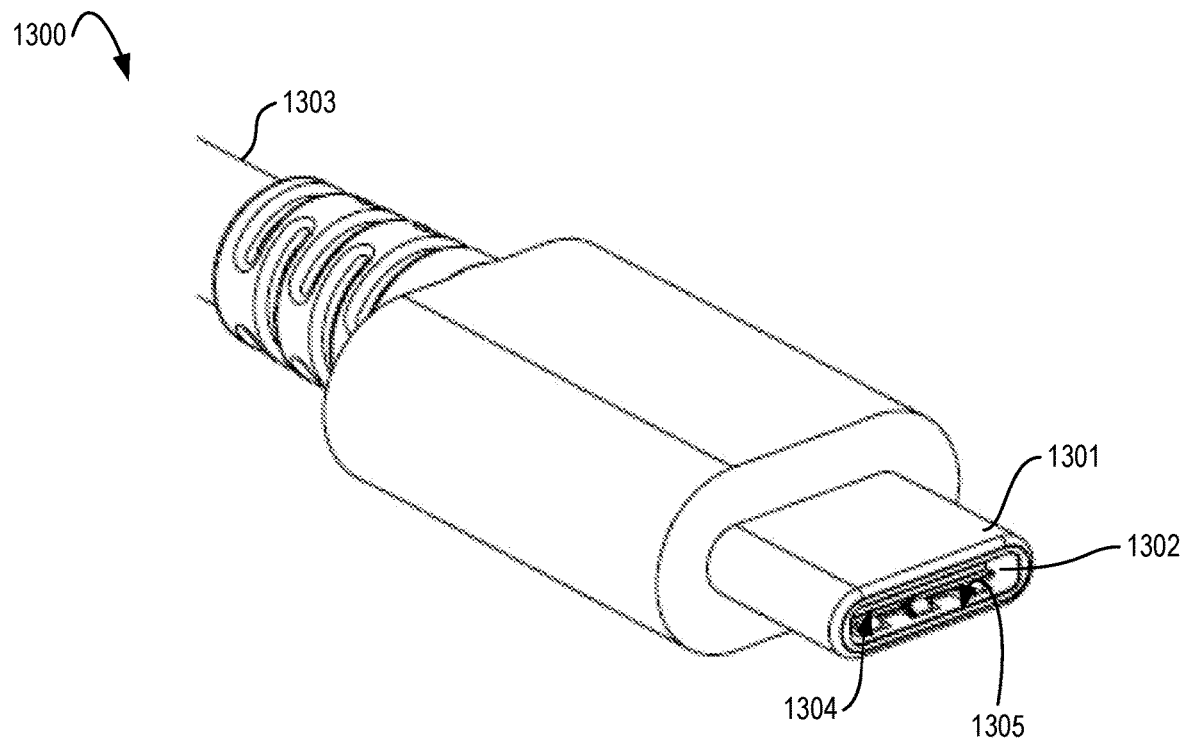
FIG. 13 illustrates a perspective view of a serial bus plug according to embodiments of the disclosure.

FIG. 13 illustrates a perspective view of a serial bus plug 1300 according to embodiments of the disclosure. In certain embodiments, serial bus plug may connect (e.g., physically and electrically) to a serial bus receptacle (e.g., serial bus receptacle 1100).

Figure 14:
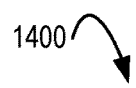
FIG. 14 illustrates a schematic diagram of the pins of a serial bus plug according to embodiments of the disclosure.

FIG. 14 illustrates a schematic diagram 1400 of the pins of a serial bus plug (e.g., serial bus plug 1300) according to embodiments of the disclosure.

In one embodiment, a plug may be received (e.g., inserted) into a receptacle in a plurality of orientations, for example, flipped from one orientation to another orientation, e.g., and retain its (e.g., full) functions. This may be referred to as "flip-ability", e.g., flip-able between a right-side up position and an upside-down position. In certain embodiments, a serial bus plug is flip-able between a right-side up position and an upside-down position (relative to the receptacle it is to be inserted into). In certain embodiments, (e.g., serial bus) plug 1300 of FIG. 13 slides within (e.g., serial bus) receptacle 1100 of FIG. 11, e.g., the housing 1301 slides within the shell 1101 (e.g., enclosure). Tongue 1102 may be (e.g., fixedly) disposed within the bore of the shell 1101 of the serial bus receptacle. Depicted tongue 1102 includes a first (e.g., substantially planar) side 1104 and an opposing second (e.g., substantially planar) side 1105. In one embodiment, first side 1104 is (e.g., substantially) parallel to the second side 1105. One or both of first side 1104 and second side 1105 may include electrical contacts (e.g., pins, pads, springs, etc.) thereon, e.g., facing in opposing directions. A longitudinal axis of each electrical contact may extend from the rear of shell 1101 towards the opening at the front of shell 1101, for example, along the first side 1104 and/or the second side 1105. A leading edge 1103 of the tongue 1102 may be (e.g., substantially) perpendicular to the first side 1104 and the second side 1105. The body of the tongue 1102, e.g., excluding any electrical contacts thereon, may be a non-conductive material, for example, glass-filled nylon. The leading edge 1103 of the tongue 1102 may not include any electrical contacts to mate with the electrical (for example, signal and/or data, e.g., but not ground) contacts of a plug. The back wall of the receptacle may not include any electrical contacts to mate with the electrical (for example, signal and/or data, e.g., but not ground) contacts of a plug.

First side 1104 may include (e.g., only) a first row of electrical contacts thereon, for example, the electrical contacts (e.g., pins) in FIG. 12, e.g., pins A1-A12. Second side 1105 may include (e.g., only) a second row of electrical contacts thereon, for example, the electrical contacts (e.g., pins) in FIG. 12, e.g., pins B12-B1. Electrical contacts may physically connect (e.g., fixedly connect) to the circuitry of a device, e.g., a multiple role togging circuit or other circuitry discussed herein.

Turning again to FIG. 13, in certain embodiments, the serial bus plug 1300 includes a housing 1301 with a bore therein, e.g., having an opening at the front of the housing 1301 and a back wall opposite of the opening. Housing 1301 may include electrical contacts in the bore thereof. A first side 1304 of the interior of the housing may be (e.g., substantially) parallel to a second side 1305 of the interior of the housing of the serial bus plug 1300. One or both of first side 1304 and second side 1305 may include electrical contacts (e.g., pins, pads, springs, etc.) thereon, e.g., facing each other. Contacts on the first side 1304 and/or the second side 1305 may couple (e.g., physically and electrically connect) to the first side 1104 and/or the second side 1105 of receptacle 1100. In one embodiment, a first side 1304 of plug 1300 couples with either of the first side 1104 and the second side 1105 of the receptacle 1100 and the second side 1305 of the plug 1300 couples with the other of the first side 1104 and the second side 1105 of the receptacle 1100 (e.g., flip-able). A longitudinal axis of each electrical contact may extend from the rear of housing 1301 towards the opening 1302 at the front of housing 1301, for example, along the first side 1304 and/or the second side 1305. Housing 1301 may be slideably received within an (e.g., continuous) annulus formed between the exterior surface of the tongue 1102 and an interior surface of the shell 1101 of the receptacle 1100. The leading edge of the housing 1301 not include any electrical contacts to mate with the electrical (for example, signal and/or data, e.g., but not ground) contacts of a receptacle. The back wall of the housing 1301 may not include any electrical contacts to mate with the electrical (for example, signal and/or data, e.g., but not ground) contacts of a receptacle. First side 1304 may include (e.g., only) a first row of electrical contacts thereon, for example, the electrical contacts (e.g., pins) in FIG. 14, e.g., pins A12-A1. Second side 1305 may include (e.g., only) a second row of electrical contacts thereon, for example, the electrical contacts (e.g., pins) in FIG. 14, e.g., pins B1-B12. Electrical contacts may physically connect (e.g., fixedly connect) to a cable 1303 or other electrical conductors (for example, wires to a memory device, e.g., a USB memory stick). Cable 1303 may connect to another plug, e.g., to connect to a receptacle that physically connects to the circuitry of a device, e.g., a multiple role togging circuit or other circuitry discussed herein.

Circuitry here may include a transmitter and/or a receiver to send and receive data, respectively, e.g., as part of a transceiver (e.g., a physical layer (PHY) circuit).

In one embodiment, an apparatus (e.g., a circuit) includes a serial bus receptacle to receive a serial bus plug of a first device and a second device; a transceiver circuit coupled to the serial bus receptacle; and a controller circuit to: switch between a first mode for a first class of data transfers and a second mode for a second class of data transfers, wherein the first class of data transfers is to preempt the second class of data transfers, schedule a data transfer with the transceiver circuit for a first endpoint of the first device at a first service interval of a bus interval when in the first mode, and schedule a data transfer with the transceiver circuit for a second, different endpoint of the second device at a second service interval that is smaller than the first service interval when in the first mode. The controller circuit may schedule a second class data transfer and the data transfer for the first endpoint within the first service interval. The controller circuit may schedule a second class data transfer and the data transfer for the second, different endpoint within the second service interval. The bus interval may be about 125 microseconds. The controller circuit may read an endpoint descriptor of the second, different (e.g., format of) endpoint of the second device to determine the second service interval. The controller circuit may guarantee bandwidth for the first class of data transfers, and not guarantee bandwidth for the second class of data transfers. The transceiver circuit may send and receive data according to a Universal Serial Bus (USB) specification. The first mode may be a USB periodic transfer mode and the second mode may be a USB bulk transfer mode. One endpoint may have a service interval that is an integer multiple of a bus interval, and a second, different endpoint may have a service interval that is a fraction of the bus interval. The second, different endpoint may comprise an indicator that indicates the fraction (e.g., a fractional service interval).

In another embodiment, an apparatus (e.g., a circuit) includes a serial bus receptacle to receive a serial bus plug of a device; a transceiver circuit coupled to the serial bus receptacle; and a controller circuit to: send a first indicator from the transceiver circuit to the device to cause the device to switch between a first mode for a first class of data transfers and a second mode for a second class of data transfers, wherein the first class of data transfers is to preempt the second class of data transfers, and send a second indicator from the transceiver circuit to the device to cause the device to schedule a data transfer for a first endpoint at a first service interval of a bus interval when in the first mode, and schedule a data transfer for a second, different endpoint at a second service interval that is smaller than the first service interval when in the first mode. The second indicator may cause the device (e.g., on receipt thereof) to schedule a second class data transfer and the data transfer for the first endpoint within the first service interval. The second indicator may cause the device (e.g., on receipt thereof) to schedule a second class data transfer and the data transfer for the second, different (e.g., format of) endpoint within the second service interval. The bus interval may be about 125 microseconds. The second indicator may be an endpoint descriptor. Receipt of the first indicator by the device may cause the device to guarantee bandwidth for the first class of data transfers, and not guarantee bandwidth for the second class of data transfers. The transceiver circuit may send and receive data according to a Universal Serial Bus (USB) specification. The first mode may be a USB periodic transfer mode and the second mode may be a USB bulk transfer mode.

In yet another embodiment, a non-transitory machine readable medium that stores code that when executed by a machine causes the machine to perform a method including electrically coupling a serial bus receptacle of a third device to a serial bus plug of a first device or a second device, wherein a transceiver circuit of the third device is coupled to the serial bus receptacle; switching a controller circuit between a first mode for a first class of data transfers and a second mode for a second class of data transfers, wherein the first class of data transfers is to preempt the second class of data transfers; scheduling a data transfer with the transceiver circuit for a first endpoint of the first device at a first service interval of a bus interval when in the first mode; and scheduling a data transfer with the transceiver circuit for a second, different endpoint of the second device at a second service interval that is smaller than the first service interval when in the first mode. The method may further include scheduling a second class data transfer and the data transfer for the first endpoint within the first service interval. The method may further include scheduling a second class data transfer and the data transfer for the second, different endpoint within the second service interval. The method may further include setting the bus interval to about 125 microseconds. The method may further include reading an endpoint descriptor of the second, different endpoint of the second device to determine the second service interval. The method may further include guaranteeing bandwidth for the first class of data transfers, and not guaranteeing bandwidth for the second class of data transfers. The method may further include sending and receiving data with the transceiver circuit according to a Universal Serial Bus (USB) specification. The first mode may be a USB periodic transfer mode and the second mode may be a USB bulk transfer mode.

In another embodiment, an apparatus (e.g., a circuit) includes a serial bus receptacle to receive a serial bus plug of a first device and a second device; a transceiver circuit coupled to the serial bus receptacle; and means to: switch between a first mode for a first class of data transfers and a second mode for a second class of data transfers, wherein the first class of data transfers is to preempt the second class of data transfers, schedule a data transfer with the transceiver circuit for a first endpoint of the first device at a first service interval of a bus interval when in the first mode, and schedule a data transfer with the transceiver circuit for a second, different endpoint of the second device at a second service interval that is smaller than the first service interval when in the first mode.

In yet another embodiment, an apparatus (e.g., a circuit) includes a serial bus receptacle to receive a serial bus plug of a device; a transceiver circuit coupled to the serial bus receptacle; and means to: send a first indicator from the transceiver circuit to the device to cause the device to switch between a first mode for a first class of data transfers and a second mode for a second class of data transfers, wherein the first class of data transfers is to preempt the second class of data transfers, and send a second indicator from the transceiver circuit to the device to cause the device to schedule a data transfer for a first endpoint at a first service interval of a bus interval when in the first mode, and schedule a data transfer for a second, different endpoint at a second service interval that is smaller than the first service interval when in the first mode.

In another embodiment, an apparatus comprises a data storage device that stores code that when executed by a hardware processor causes the hardware processor to perform any method disclosed herein. An apparatus may be as described in the detailed description. A method may be as described in the detailed description.

In yet another embodiment, a non-transitory machine readable medium that stores code that when executed by a machine causes the machine to perform a method comprising any method disclosed herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality of Service (QoS), Hot-Plug/Hot-Swap support, Data Integrity, and Error Handling are among some of the advanced features supported by PCI Express.

Figure 15:
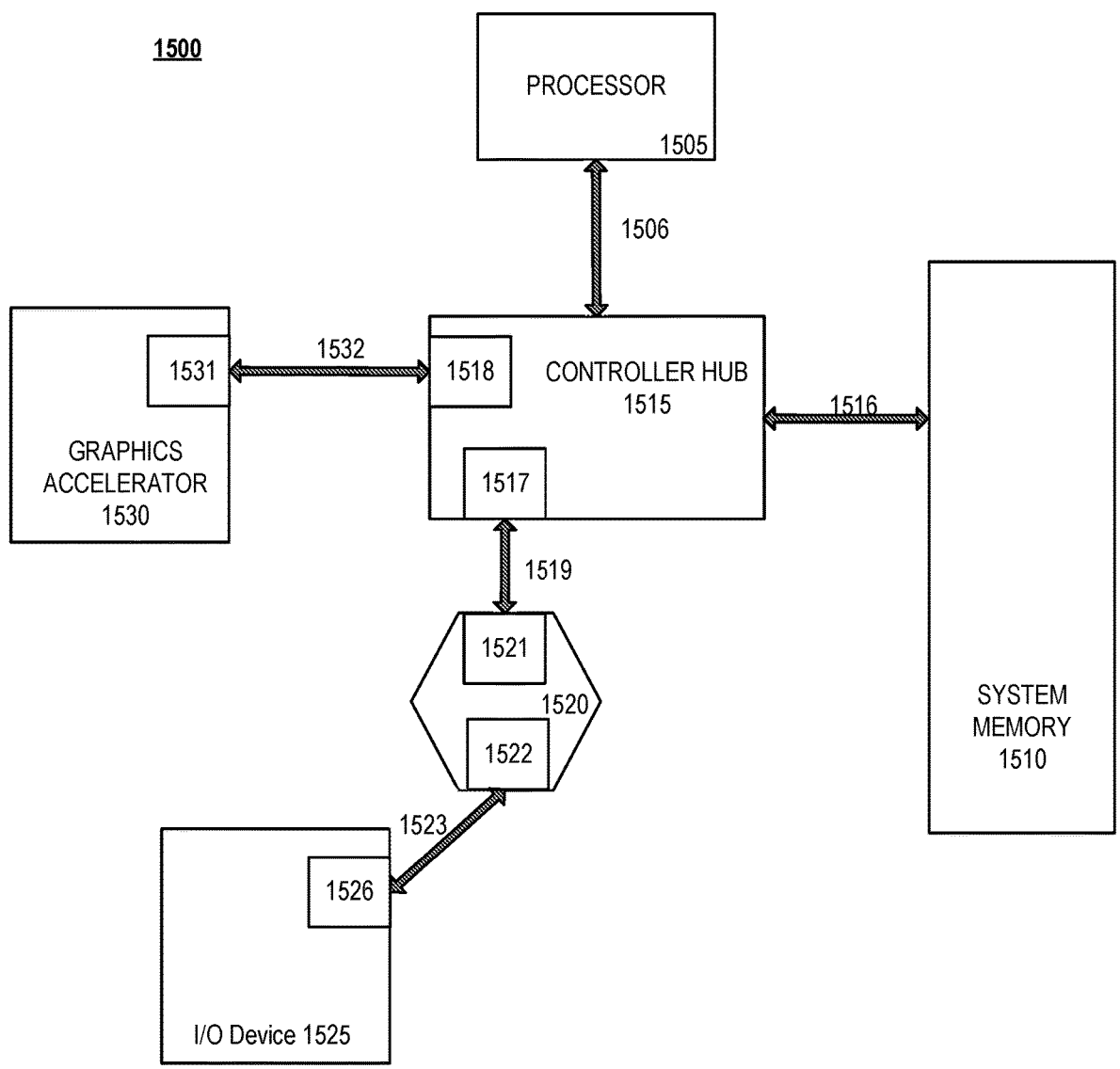
FIG. 15 illustrates a computing system including a peripheral component interconnect express (PCIe) compliant architecture according to embodiments of the disclosure.

Referring to FIG. 15, an embodiment of a fabric composed of point-to-point Links that interconnect a set of components is illustrated. System 1500 includes processor 1505 and system memory 1510 coupled to controller hub 1515. Processor 1505 includes any processing element, such as a microprocessor, a host processor, an embedded processor, a co-processor, or other processor. Processor 1505 is coupled to controller hub 1515 through front-side bus (FSB) 1506. In one embodiment, FSB 1506 is a serial point-to-point interconnect as described below. In another embodiment, link 1506 includes a serial, differential interconnect architecture that is compliant with different interconnect standard.

System memory 1510 includes any memory device, such as random access memory (RAM), non-volatile (NV) memory, or other memory accessible by devices in system 1500. System memory 1510 is coupled to controller hub 1515 through memory interface 1516. Examples of a memory interface include a double-data rate (DDR) memory interface, a dual-channel DDR memory interface, and a dynamic RAM (DRAM) memory interface.

In one embodiment, controller hub 1515 is a root hub, root complex, or root controller in a Peripheral Component Interconnect Express (PCIe or PCIE) interconnection hierarchy. Examples of controller hub 1515 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 1505, while controller 1515 is to communicate with I/O devices, in a similar manner as described below. In some embodiments, peer-to-peer routing is optionally supported through root complex 1515.

Here, controller hub 1515 is coupled to switch/bridge 1520 through serial link 1519. Input/output modules 1517 and 1521, which may also be referred to as interfaces/ports 1517 and 1521, include/implement a layered protocol stack to provide communication between controller hub 1515 and switch 1520. In one embodiment, multiple devices are capable of being coupled to switch 1520.

Switch/bridge 1520 routes packets/messages from device 1525 upstream, e.g., up a hierarchy towards a root complex, to controller hub 1515 and downstream, e.g., down a hierarchy away from a root controller, from processor 1505 or system memory 1510 to device 1525. Switch 1520, in one embodiment, is referred to as a logical assembly of multiple virtual PCI-to-PCI bridge devices. Device 1525 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 1525 may include a PCIe to PCI/PCI-X bridge to support legacy or other version PCI devices. Endpoint devices in PCIe are often classified as legacy, PCIe, or root complex integrated endpoints.

Graphics accelerator 1530 is also coupled to controller hub 1515 through serial link 1532. In one embodiment, graphics accelerator 1530 is coupled to an MCH, which is coupled to an ICH. Switch 1520, and accordingly to I/O device 1525 through serial link 1523, is then coupled to the ICH. I/O modules 1531 and 1518 are also to implement a layered protocol stack to communicate between graphics accelerator 1530 and controller hub 1515. Similar to the MCH discussion above, a graphics controller or the graphics accelerator 1530 itself may be integrated in processor 1505.

Figure 16:
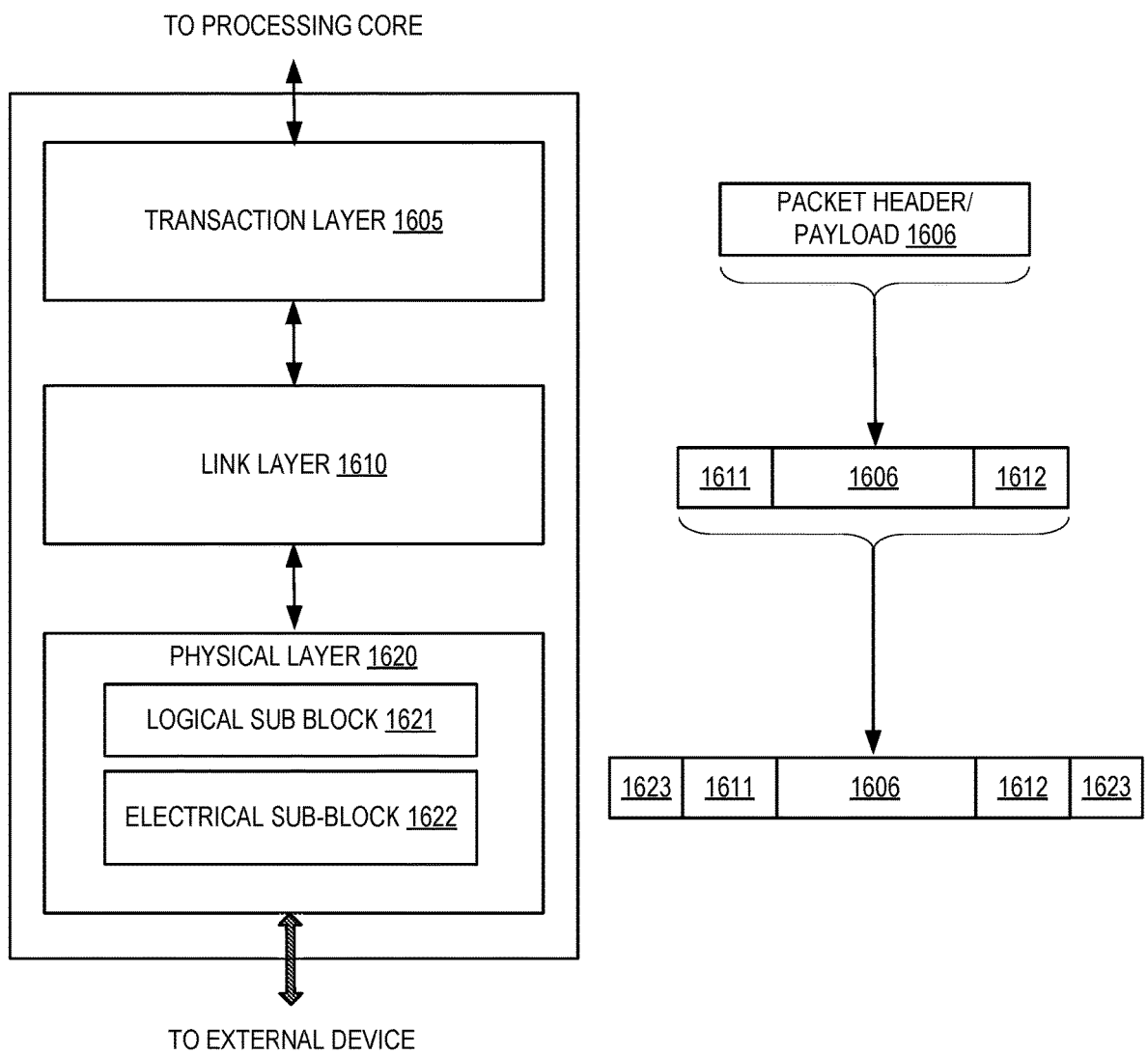
FIG. 16 illustrates a PCIe compliant interconnect architecture including a layered stack according to embodiments of the disclosure.

Turning to FIG. 16 an embodiment of a layered protocol stack is illustrated. Layered protocol stack 1600 includes any form of a layered communication stack, such as a Quick Path Interconnect (QPI) stack, a PCIe stack, a next generation high performance computing interconnect stack, or other layered stack. Although the discussion immediately below in reference to FIGS. 15-18 are in relation to a PCIe stack, the same concepts may be applied to other interconnect stacks. In one embodiment, protocol stack 1600 is a PCIe protocol stack including transaction layer 1605, link layer 1610, and physical layer 1620. An interface, such as interfaces 1517, 1518, 1521, 1522, 1526, and 1531 in FIG. 15, may be represented as communication protocol stack 1600. Representation as a communication protocol stack may also be referred to as a module or interface implementing/including a protocol stack.

PCI Express uses packets to communicate information between components. Packets are formed in the Transaction Layer 1605 and Data Link Layer 1610 to carry the information from the transmitting component to the receiving component. As the transmitted packets flow through the other layers, they are extended with additional information necessary to handle packets at those layers. At the receiving side the reverse process occurs and packets get transformed from their Physical Layer 1620 representation to the Data Link Layer 1610 representation and finally (for Transaction Layer Packets) to the form that can be processed by the Transaction Layer 1605 of the receiving device.

Transaction Layer

In one embodiment, transaction layer 1605 is to provide an interface between a device's processing core and the interconnect architecture, such as data link layer 1610 and physical layer 1620. In this regard, a primary responsibility of the transaction layer 1605 is the assembly and disassembly of packets (e.g., transaction layer packets, or TLPs). The translation layer 1605 typically manages credit-base flow control for TLPs. PCIe implements split transactions, e.g., transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1605. An external device at the opposite end of the link, such as controller hub 1515 in FIG. 15, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1605 assembles packet header/payload 1606. Format for current packet headers/payloads may be found in the PCIe specification at the PCIe specification website.

Figure 17:
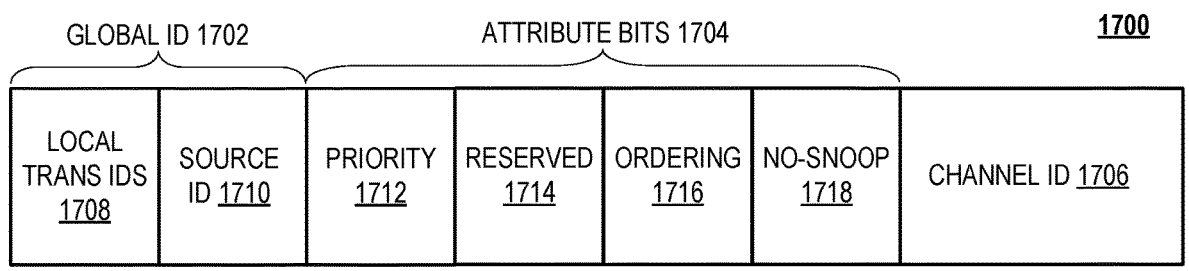
FIG. 17 illustrates a PCIe compliant request or packet to be generated or received within an interconnect architecture according to embodiments of the disclosure.

Referring to FIG. 17, an embodiment of a PCIe transaction descriptor is illustrated. In one embodiment, transaction descriptor 1700 is a mechanism for carrying transaction information. In this regard, transaction descriptor 1700 supports identification of transactions in a system. Other potential uses include tracking modifications of default transaction ordering and association of transaction with channels.

Transaction descriptor 1700 includes global identifier field 1702, attributes field 1704 and channel identifier field 1706. In the illustrated example, global identifier field 1702 is depicted comprising local transaction identifier field 1708 and source identifier field 1710. In one embodiment, global transaction identifier 1702 is unique for all outstanding requests.

According to one implementation, local transaction identifier field 1708 is a field generated by a requesting agent, and it is unique for all outstanding requests that require a completion for that requesting agent. Furthermore, in this example, source identifier 1710 uniquely identifies the requestor agent within a PCIe hierarchy. Accordingly, together with source ID 1710, local transaction identifier 1708 field provides global identification of a transaction within a hierarchy domain.

Attributes field 1704 specifies characteristics and relationships of the transaction. In this regard, attributes field 1704 is potentially used to provide additional information that allows modification of the default handling of transactions. In one embodiment, attributes field 1704 includes priority field 1712, reserved field 1714, ordering field 1716, and no-snoop field 1718. Here, priority sub-field 1712 may be modified by an initiator to assign a priority to the transaction. Reserved attribute field 1714 is left reserved for future, or vendor-defined usage. Possible usage models using priority or security attributes may be implemented using the reserved attribute field.

In this example, ordering attribute field 1716 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1718 is utilized to determine if transactions are snooped. As shown, channel ID Field 1706 identifies a channel that a transaction is associated with.

Link Layer

Link layer 1610, also referred to as data link layer 1610, acts as an intermediate stage between transaction layer 1605 and the physical layer 1620. In one embodiment, a responsibility of the data link layer 1610 is providing a reliable mechanism for exchanging Transaction Layer Packets (TLPs) between two components a link. One side of the Data Link Layer 1610 accepts TLPs assembled by the Transaction Layer 1605, applies packet sequence identifier 1611, e.g., an identification number or packet number, calculates and applies an error detection code, e.g., CRC 1612, and submits the modified TLPs to the Physical Layer 1620 for transmission across a physical to an external device.

Physical Layer

In one embodiment, physical layer 1620 includes logical sub block 1621 and electrical sub-block 1622 to physically transmit a packet to an external device. Here, logical sub-block 1621 is responsible for the "digital" functions of Physical Layer 1621. In this regard, the logical sub-block includes a transmit section to prepare outgoing information for transmission by physical sub-block 1622, and a receiver section to identify and prepare received information before passing it to the Link Layer 1610.

Physical block 1622 includes a transmitter and a receiver. The transmitter is supplied by logical sub-block 1621 with symbols, which the transmitter serializes and transmits onto to an external device. The receiver is supplied with serialized symbols from an external device and transforms the received signals into a bit-stream. The bit-stream is de-serialized and supplied to logical sub-block 1621. In one embodiment, an 8b/10b transmission code is employed, where ten-bit symbols are transmitted/received. Here, special symbols are used to frame a packet with frames 1623. In addition, in one example, the receiver also provides a symbol clock recovered from the incoming serial stream.

As stated above, although transaction layer 1605, link layer 1610, and physical layer 1620 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, e.g., a transaction layer; a second layer to sequence packets, e.g., a link layer; and a third layer to transmit the packets, e.g., a physical layer. As a specific example, a common standard interface (CSI) layered protocol is utilized.

Figure 18:
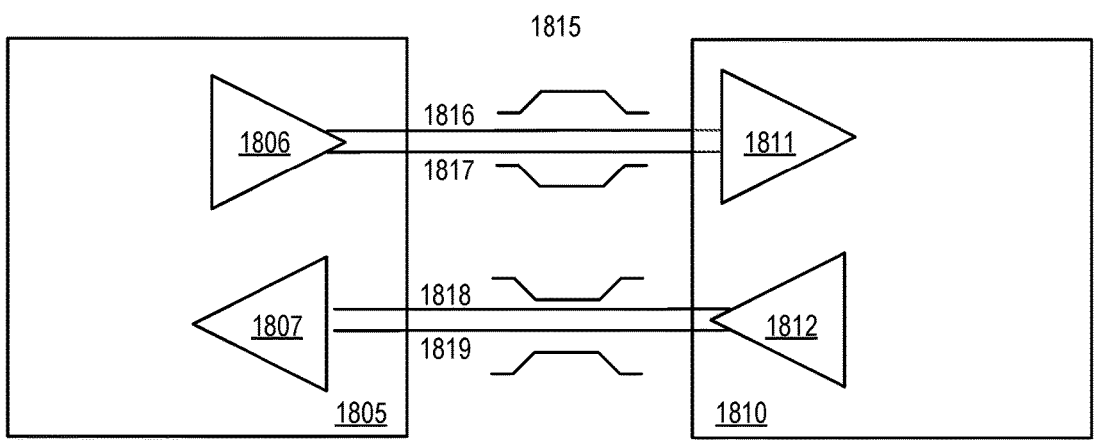
FIG. 18 illustrates a transmitter and receiver pair for a PCIe compliant interconnect architecture according to embodiments of the disclosure.

Referring next to FIG. 18, an embodiment of a PCIe serial point to point fabric 1800 is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1806/1811 and a receive pair 1812/1807. Accordingly, device 1805 includes transmission logic 1806 to transmit data to device 1810 and receiving logic 1807 to receive data from device 1810. In other words, two transmitting paths, e.g., paths 1816 and 1817, and two receiving paths, e.g., paths 1818 and 1819, are included in a PCIe link.

A transmission path refers to any path for transmitting data, such as a transmission line, a copper line, an optical line, a wireless communication channel, an infrared communication link, or other communication path. A connection between two devices, such as device 1805 and device 1810, is referred to as a link, such as link 1815. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1816 and 1817, to transmit differential signals. As an example, when line 1816 toggles from a low voltage level to a high voltage level, e.g., a rising edge, line 1817 drives from a high logic level to a low logic level, e.g., a falling edge. Differential signals potentially demonstrate better electrical characteristics, such as better signal integrity, e.g., cross-coupling, voltage overshoot/undershoot, ringing, etc. This allows for better timing window, which enables faster transmission frequencies.

Figure 19:
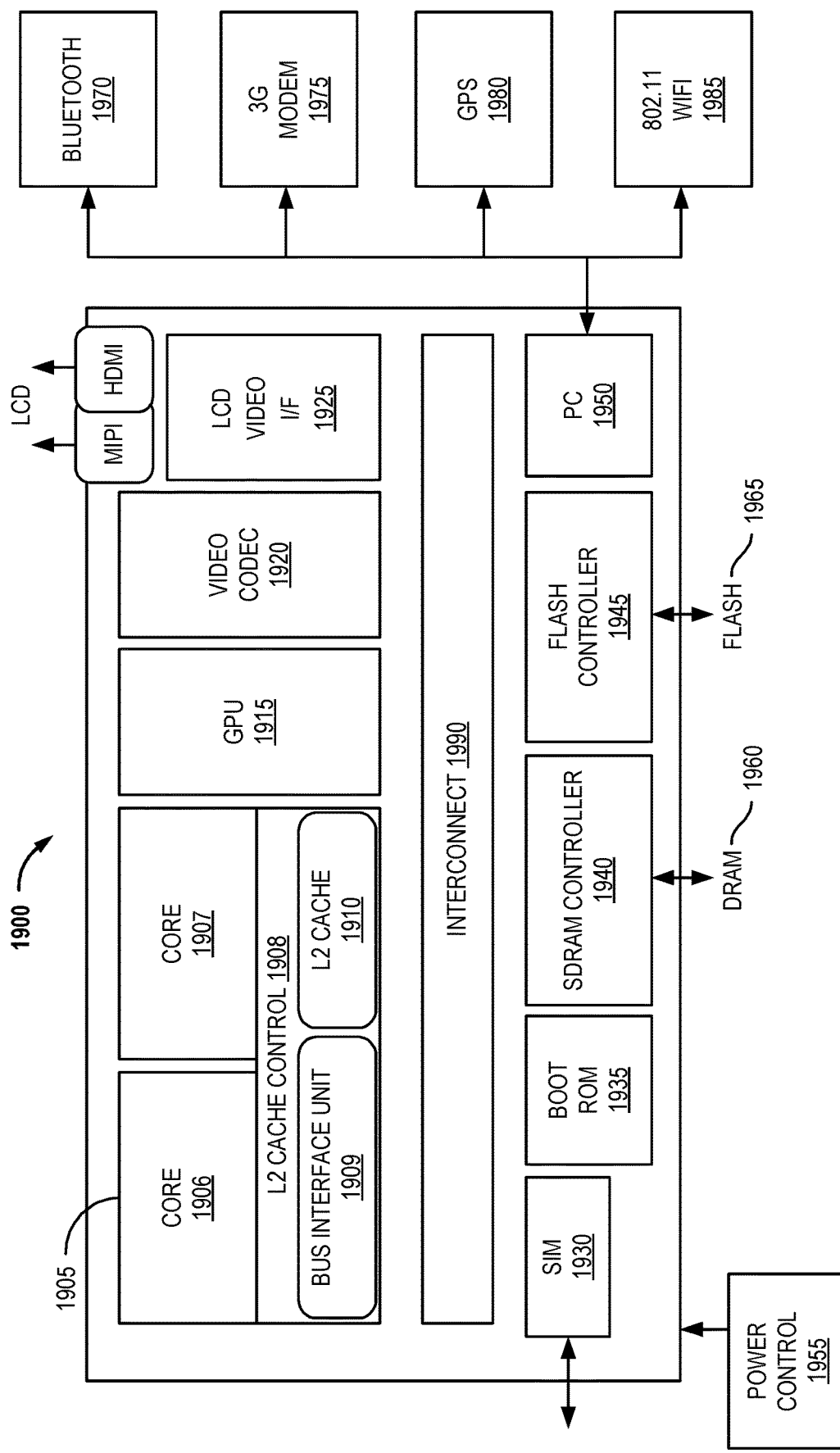
FIG. 19 illustrates a computing system on a chip according to embodiments of the disclosure.

Turning next to FIG. 19, an embodiment of a system on-chip (SOC) design in accordance with the embodiments is depicted. As a specific illustrative example, SOC 1900 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1900 includes 2 cores-1906 and 1907. Similar to the discussion above, cores 1906 and 1907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1906 and 1907 are coupled to cache control 1908 that is associated with bus interface unit 1909 and L2 cache 1910 to communicate with other parts of system 1900. Interconnect 1990 includes an on-chip interconnect, such as an IOSF, AMBA, or other interconnect discussed above, which potentially implements one or more aspects of the described embodiments.

Interconnect 1990 provides communication channels to the other components, such as a Subscriber Identity Module (SIM) 1930 to interface with a SIM card, a boot ROM 1935 to hold boot code for execution by cores 1906 and 1907 to initialize and boot SOC 1900, a SDRAM controller 1940 to interface with external memory (e.g. DRAM 1960), a flash controller 1945 to interface with non-volatile memory (e.g. Flash 1965), a peripheral control 1950 (e.g. Serial Peripheral Interface) to interface with peripherals, video codecs 1920 and Video interface 1925 to display and receive input (e.g. touch enabled input), GPU 1915 to perform graphics related computations, etc. Any of these interfaces may incorporate aspects of the embodiments described herein.

In addition, the system illustrates peripherals for communication, such as a Bluetooth module 1970, 3G modem 1975, GPS 1980, and WiFi 1985. Note as stated above, a UE includes a radio for communication. As a result, these peripheral communication modules are not all required. However, in a UE some form a radio for external communication is to be included.

Note that the apparatus, methods, and systems described above may be implemented in any electronic device or system as aforementioned. As specific illustrations, the figures below provide exemplary systems for utilizing the embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 20:
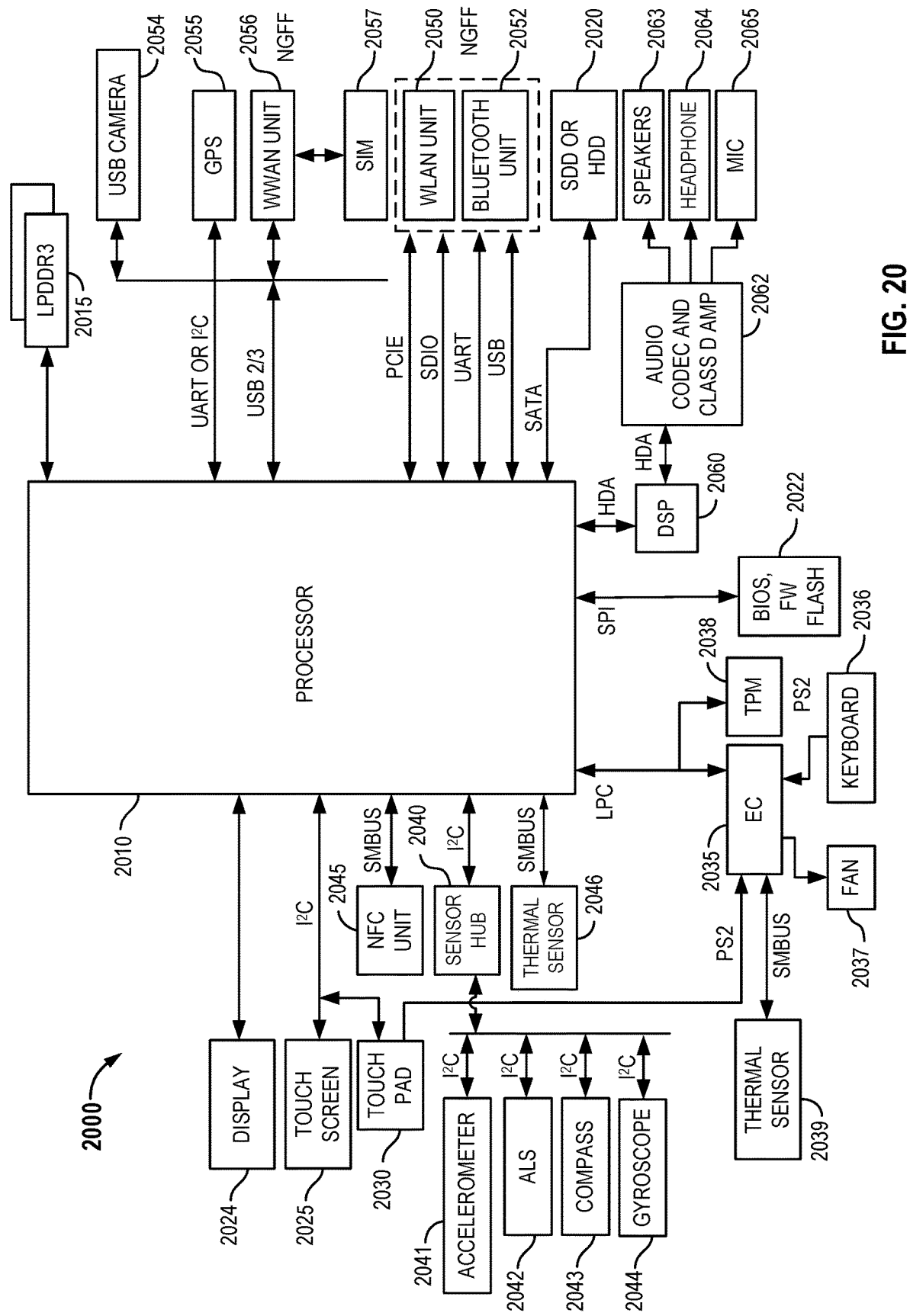
FIG. 20 illustrates an embodiment of a block diagram for a computing system.

Referring now to FIG. 20, a block diagram of components present in a computer system in accordance with embodiments of the disclosure is illustrated. As shown in FIG. 20, system 2000 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 20 is intended to show a high level view of many components of the computer system. However, it is to be understood that some of the components shown may be omitted, additional components may be present, and different arrangement of the components shown may occur in other implementations. As a result, the embodiments described above may be implemented in any portion of one or more of the interconnects illustrated or described below.

As seen in FIG. 20, a processor 2010, in one embodiment, includes a microprocessor, multi-core processor, multi-threaded processor, an ultra low voltage processor, an embedded processor, or other known processing element. In the illustrated implementation, processor 2010 acts as a main processing unit and central hub for communication with many of the various components of the system 2000. As one example, processor 2010 is implemented as a system on a chip (SoC). As a specific illustrative example, processor 2010 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 2010 in one implementation will be discussed further below to provide an illustrative example.

Processor 2010, in one embodiment, communicates with a system memory 2015. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 2020 may also couple to processor 2010. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 20, a flash device 2022 may be coupled to processor 2010, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 2000. Specifically shown in the embodiment of FIG. 20 is a display 2024 which may be a high definition LCD or LED panel configured within a lid portion of the chassis. This display panel may also provide for a touch screen 2025, e.g., adapted externally over the display panel such that via a user's interaction with this touch screen, user inputs can be provided to the system to enable desired operations, e.g., with regard to the display of information, accessing of information and so forth. In one embodiment, display 2024 may be coupled to processor 2010 via a display interconnect that can be implemented as a high performance graphics interconnect. Touch screen 2025 may be coupled to processor 2010 via another interconnect, which in an embodiment can be an I$^2$C interconnect. As further shown in FIG. 20, in addition to touch screen 2025, user input by way of touch can also occur via a touch pad 2030 which may be configured within the chassis and may also be coupled to the same I$^2$C interconnect as touch screen 2025.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080 p), be compatible with an embedded display port (eDP), and be a low power panel with panel self-refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 2010 in different manners. Certain inertial and environmental sensors may couple to processor 2010 through a sensor hub 2040, e.g., via an I²C interconnect. In the embodiment shown in FIG. 20, these sensors may include an accelerometer 2041, an ambient light sensor (ALS) 2042, a compass 2043 and a gyroscope 2044. Other environmental sensors may include one or more thermal sensors 2046 which in some embodiments couple to processor 2010 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 20, various peripheral devices may couple to processor 2010 via a low pin count (LPC) interconnect. In the embodiment shown, various components can be coupled through an embedded controller (EC) 2035. Such components can include a keyboard 2036 (e.g., coupled via a PS2 interface), a fan 2037, and a thermal sensor 2039. In some embodiments, touch pad 2030 may also couple to EC 2035 via a PS2 interface. In addition, a security processor such as a trusted platform module (TPM) 2038 in accordance with the Trusted Computing Group (TCG) TPM Specification Version 1.2, dated Oct. 2, 2003, may also couple to processor 2010 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with a Universal Serial Bus specification, with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 2000 can communicate with external devices in a variety of manners, including wirelessly. In the embodiment shown in FIG. 20, various wireless modules, each of which can correspond to a radio configured for a particular wireless communication protocol, are present. One manner for wireless communication in a short range such as a near field may be via a near field communication (NFC) unit 2045 which may communicate, in one embodiment with processor 2010 via an SMBus. Note that via this NFC unit 2045, devices in close proximity to each other can communicate. For example, a user can enable system 2000 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 20, additional wireless units can include other short range wireless engines including a WLAN unit 2050 and a Bluetooth unit 2052. Using WLAN unit 2050, Wi-Fi™ communications in accordance with a given Institute of Electrical and Electronics Engineers (IEEE) 802.11 standard can be realized, while via Bluetooth unit 2052, short range communications via a Bluetooth protocol can occur. These units may communicate with processor 2010 via, e.g., a USB link or a universal asynchronous receiver transmitter (UART) link. Or these units may couple to processor 2010 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 2056 which in turn may couple to a subscriber identity module (SIM) 2057. In addition, to enable receipt and use of location information, a GPS module 2055 may also be present. Note that in the embodiment shown in FIG. 20, WWAN unit 2056 and an integrated capture device such as a camera module 2054 may communicate via a given USB protocol, e.g., USB 2.0 or 3.0 link, or a UART or I$^2$C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 2060, which may couple to processor 2010 via a high definition audio (HDA) link. Similarly, DSP 2060 may communicate with an integrated coder/decoder (CODEC) and amplifier 2062 that in turn may couple to output speakers 2063 which may be implemented within the chassis. Similarly, amplifier and CODEC 2062 can be coupled to receive audio inputs from a microphone 2065 which in an embodiment can be implemented via dual array microphones (such as a digital microphone array) to provide for high quality audio inputs to enable voice-activated control of various operations within the system. Note also that audio outputs can be provided from amplifier/CODEC 2062 to a headphone jack 2064. Although shown with these particular components in the embodiment of FIG. 20, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 2010 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 2035. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1735 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 17, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 21:
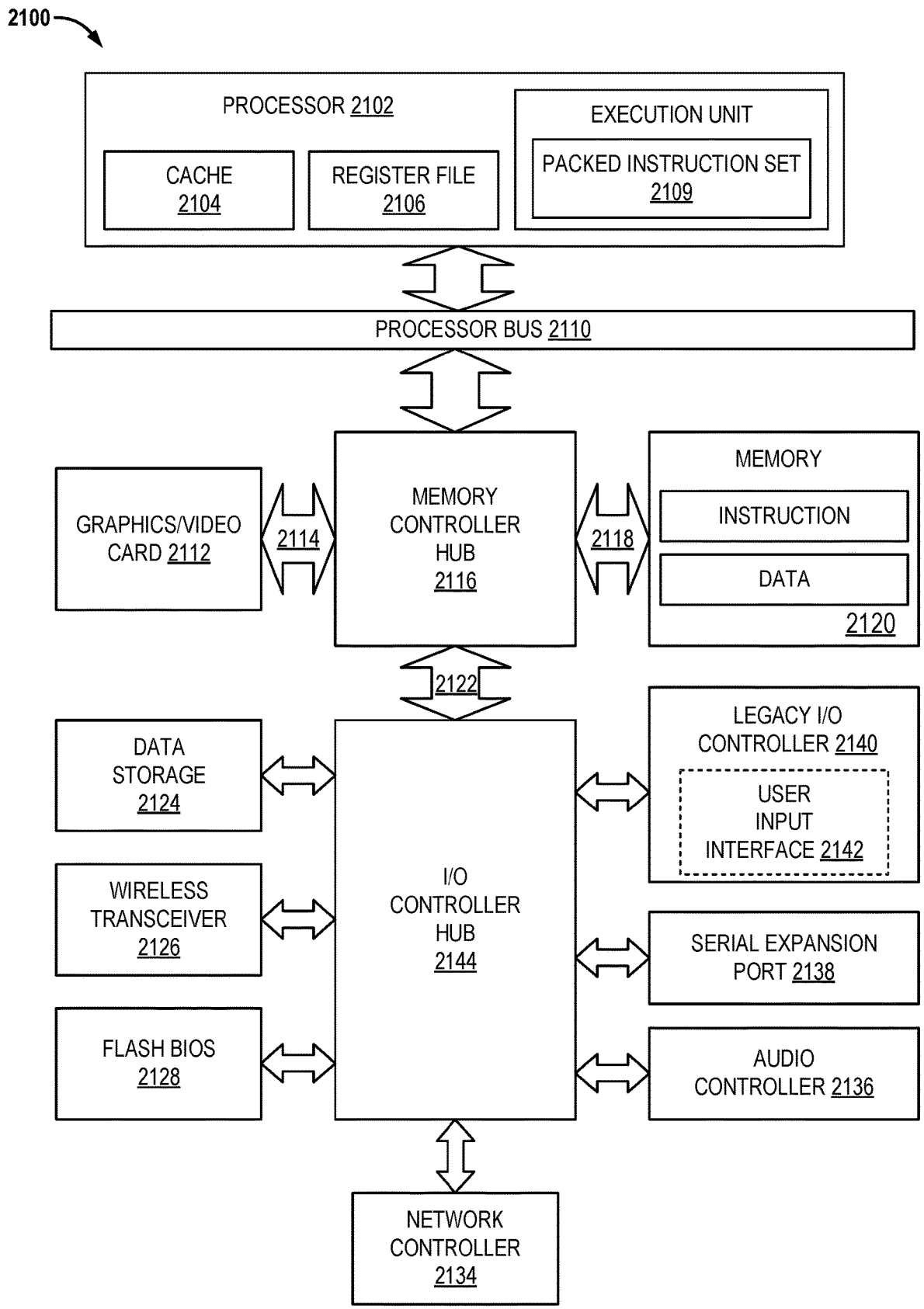
FIG. 21 illustrates another embodiment of a block diagram for a computing system.

Turning to FIG. 21, a block diagram of an exemplary computer system formed with a processor that includes execution units to execute an instruction, where one or more of the interconnects implement one or more features in accordance with embodiments of the disclosure is illustrated. System 2100 includes a component, such as a processor 2102 to employ execution units including logic to perform algorithms for process data, in accordance with the present disclosure, such as in the embodiment described herein. System 2100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 2100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 2102 includes one or more execution units 2108 to implement an algorithm that is to perform at least one instruction. One embodiment may be described in the context of a single processor desktop or server system, but alternative embodiments may be included in a multiprocessor system. System 2100 is an example of a 'hub' system architecture. The computer system 2100 includes a processor 2102 to process data signals. The processor 2102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 2102 is coupled to a processor bus 2110 that transmits data signals between the processor 2102 and other components in the system 2100. The elements of system 2100 (e.g. graphics accelerator 2112, memory controller hub 2116, memory 2120, I/O controller hub 2144, wireless transceiver 2126, Flash BIOS 2128, Network controller 2134, Audio controller 2136, Serial expansion port 2138, I/O controller 2140, etc.) perform their conventional functions that are well known to those familiar with the art.

In one embodiment, the processor 2102 includes a Level 1 (L1) internal cache memory 2104. Depending on the architecture, the processor 2102 may have a single internal cache or multiple levels of internal caches. Other embodiments include a combination of both internal and external caches depending on the particular implementation and needs. Register file 2106 is to store different types of data in various registers including integer registers, floating point registers, vector registers, banked registers, shadow registers, checkpoint registers, status registers, and instruction pointer register.

Execution unit 2108, including logic to perform integer and floating point operations, also resides in the processor 2102. The processor 2102, in one embodiment, includes a microcode (μcode) ROM to store microcode, which when executed, is to perform algorithms for certain macroinstructions or handle complex scenarios. Here, microcode is potentially updateable to handle logic bugs/fixes for processor 2102. For one embodiment, execution unit 2108 includes logic to handle a packed instruction set 2109. By including the packed instruction set 2109 in the instruction set of a general-purpose processor 2102, along with associated circuitry to execute the instructions, the operations used by many multimedia applications may be performed using packed data in a general-purpose processor 2102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 2108 may also be used in micro controllers, embedded processors, graphics devices, DSPs, and other types of logic circuits. System 2100 includes a memory 2120. Memory 2120 includes a dynamic random access memory (DRAM) device, a static random access memory (SRAM) device, flash memory device, or other memory device. Memory 2120 stores instructions and/or data represented by data signals that are to be executed by the processor 2102.

Note that any of the aforementioned features or aspects of the embodiments of the disclosure may be utilized on one or more interconnect illustrated in FIG. 21. For example, an on-die interconnect (ODI), which is not shown, for coupling internal units of processor 2102 implements one or more aspects of the disclosure herein. Or the embodiments of the disclosure are associated with a processor bus 2110 (e.g. Intel Quick Path Interconnect (QPI) or other known high performance computing interconnect), a high bandwidth memory path 2118 to memory 2120, a point-to-point link 2114 to graphics accelerator 2112 (e.g. a Peripheral Component Interconnect express (PCIe) compliant fabric), a controller hub interconnect 2122, an I/O or other interconnect (e.g. USB, PCI, PCIe) for coupling the other illustrated components. Some examples of such components include the audio controller 2136, firmware hub (flash BIOS) 2128, wireless transceiver 2126, data storage 2124, legacy I/O controller 2110 containing user input and keyboard interfaces 2142, a serial expansion port 2138 such as Universal Serial Bus (USB), and a network controller 2134. The data storage device 2124 can comprise a hard disk drive, a floppy disk drive, a CD-ROM device, a flash memory device, or other mass storage device.

Figure 22:
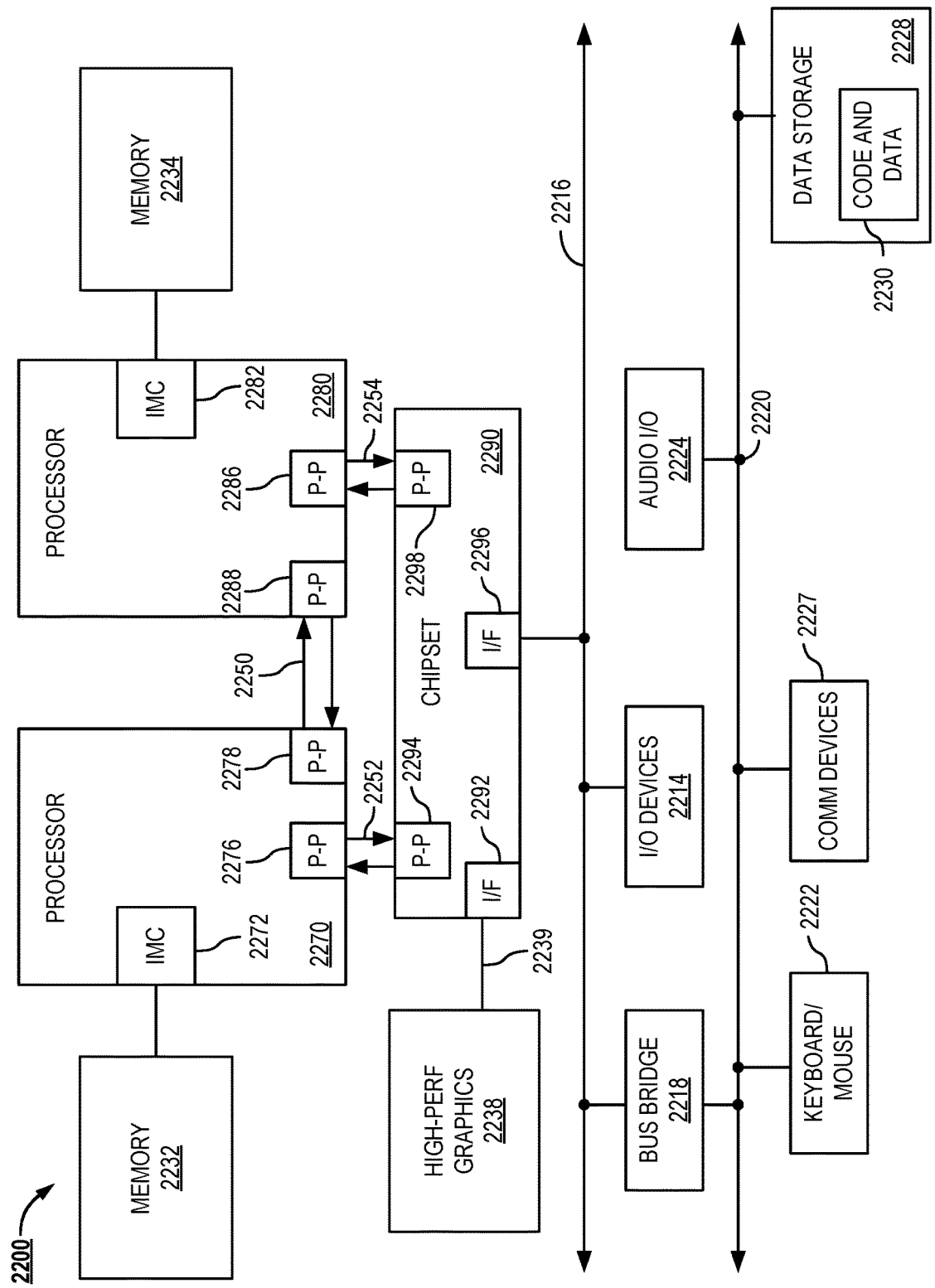
FIG. 22 illustrates another embodiment of a block diagram for a computing system.

Referring now to FIG. 22, shown is a block diagram of a second system 2200 in accordance with an embodiment of the present disclosure. As shown in FIG. 22, multiprocessor system 2200 is a point-to-point interconnect system, and includes a first processor 2270 and a second processor 2280 coupled via a point-to-point interconnect 2250. Each of processors 2270 and 2280 may be some version of a processor. In one embodiment, 2252 and 2254 are part of a serial, point-to-point coherent interconnect fabric, such as Intel's Quick Path Interconnect (QPI) architecture. As a result, embodiments of the disclosure may be implemented within the QPI architecture.

While shown with only two processors 2270, 2280, it is to be understood that the scope of the present disclosure is not so limited. In other embodiments, one or more additional processors may be present in a given processor.

Processors 2270 and 2280 are shown including integrated memory controller units 2272 and 2282, respectively. Processor 2270 also includes as part of its bus controller units point-to-point (P-P) interfaces 2276 and 2278; similarly, second processor 2280 includes P-P interfaces 2286 and 2288. Processors 2270, 2280 may exchange information via a point-to-point (P-P) interface 2250 using P-P interface circuits 2278, 2288. As shown in FIG. 22, IMCs 2272 and 2282 couple the processors to respective memories, namely a memory 2232 and a memory 2234, which may be portions of main memory locally attached to the respective processors.

Processors 2270, 2280 each exchange information with a chipset 2290 via individual P-P interfaces 2252, 2254 using point to point interface circuits 2276, 2294, 2286, 2298. Chipset 2290 also exchanges information with a high-performance graphics circuit 2238 via an interface circuit 2292 along a high-performance graphics interconnect 2239.

A shared cache (not shown) may be included in either processor or outside of both processors; yet connected with the processors via P-P interconnect, such that either or both processors' local cache information may be stored in the shared cache if a processor is placed into a low power mode.

Chipset 2290 may be coupled to a first bus 2216 via an interface 2296. In one embodiment, first bus 2216 may be a Peripheral Component Interconnect (PCI) bus, or a bus such as a PCI Express bus or another third generation I/O interconnect bus, although the scope of the present disclosure is not so limited.

As shown in FIG. 22, various I/O devices 2214 are coupled to first bus 2216, along with a bus bridge 2218 which couples first bus 2216 to a second bus 2220. In one embodiment, second bus 2220 includes a low pin count (LPC) bus. Various devices are coupled to second bus 2220 including, for example, a keyboard and/or mouse 2222, communication devices 2227 and a storage unit 2228 such as a disk drive or other mass storage device which often includes instructions/code and data 2230, in one embodiment. Further, an audio I/O 2224 is shown coupled to second bus 2220. Note that other architectures are possible, where the included components and interconnect architectures vary. For example, instead of the point-to-point architecture of FIG. 22, a system may implement a multi-drop bus or other such architecture.

Embodiments (e.g., of the mechanisms) disclosed herein may be implemented in hardware (e.g., a computer programmed to perform a method may be as described in the detailed description), software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be executed to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The mechanisms described herein are not limited in scope to any particular programming language. The language may be a compiled or interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, which may be generally referred to as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

What is claimed is:

1. An apparatus comprising:
a serial bus receptacle to receive a serial bus plug of a first device and a second device;
a transceiver circuit coupled to the serial bus receptacle; and
a controller circuit to:
switch between a first mode for a first class of data transfers and a second mode for a second class of data transfers, wherein the first class of data transfers is to preempt the second class of data transfers,
schedule a data transfer with the transceiver circuit for a first endpoint of the first device at a first service interval of a bus interval when in the first mode, and
schedule a data transfer with the transceiver circuit for a second, different endpoint of the second device at a second service interval that is smaller than the first service interval when in the first mode, wherein the controller circuit is to read an endpoint descriptor of the second, different endpoint of the second device to determine the second, different endpoint supports the second service interval for the first mode that is smaller than a legacy service interval for the first mode.

2. The apparatus of claim 1, wherein the controller circuit is to schedule a second class data transfer and the data transfer for the first endpoint within the first service interval.

3. The apparatus of claim 1, wherein the controller circuit is to schedule a second class data transfer and the data transfer for the second, different endpoint within the second service interval.

4. The apparatus of claim 1, wherein the bus interval is about 125 microseconds.

5. The apparatus of claim 1, wherein the endpoint descriptor of the second, different endpoint of the second device is to indicate the second service interval is a fraction of the bus interval.

6. The apparatus of claim 1, wherein the controller circuit is to guarantee bandwidth for the first class of data transfers, and not guarantee bandwidth for the second class of data transfers.

7. The apparatus of claim 1, wherein the transceiver circuit is to send and receive data according to a Universal Serial Bus (USB) specification.

8. The apparatus of claim 7, wherein the first mode is a USB periodic transfer mode and the second mode is a USB bulk transfer mode.

9. An apparatus comprising:
a serial bus receptacle to receive a serial bus plug of a device;
a transceiver circuit coupled to the serial bus receptacle; and
a controller circuit to:
send a first indicator from the transceiver circuit to the device to cause the device to switch between a first mode for a first class of data transfers and a second mode for a second class of data transfers, wherein the first class of data transfers is to preempt the second class of data transfers, and
send a second indicator from the transceiver circuit to the device to cause the device to schedule a data transfer for a first endpoint at a first service interval of a bus interval when in the first mode, and schedule a data transfer for a second, different endpoint at a second service interval that is smaller than the first service interval when in the first mode, wherein the controller circuit is to read an endpoint descriptor of the second, different endpoint to determine the second, different endpoint supports the second service interval for the first mode that is smaller than a legacy service interval for the first mode.

10. The apparatus of claim 9, wherein the second indicator is to cause the device to schedule a second class data transfer and the data transfer for the first endpoint within the first service interval.

11. The apparatus of claim 9, wherein the second indicator is to cause the device to schedule a second class data transfer and the data transfer for the second, different endpoint within the second service interval.

12. The apparatus of claim 9, wherein the bus interval is about 125 microseconds.

13. The apparatus of claim 9, wherein the endpoint descriptor is to indicate the second service interval is a fraction of the bus interval.

14. The apparatus of claim 9, wherein receipt of the first indicator by the device is to cause the device to guarantee bandwidth for the first class of data transfers, and not guarantee bandwidth for the second class of data transfers.

15. The apparatus of claim 9, wherein the transceiver circuit is to send and receive data according to a Universal Serial Bus (USB) specification.

16. The apparatus of claim 15, wherein the first mode is a USB periodic transfer mode and the second mode is a USB bulk transfer mode.

17. A non-transitory machine readable medium that stores code that when executed by a machine causes the machine to perform a method comprising:
electrically coupling a serial bus receptacle of a third device to a serial bus plug of a first device or a second device, wherein a transceiver circuit of the third device is coupled to the serial bus receptacle;
switching a controller circuit between a first mode for a first class of data transfers and a second mode for a second class of data transfers, wherein the first class of data transfers is to preempt the second class of data transfers;
scheduling a data transfer with the transceiver circuit for a first endpoint of the first device at a first service interval of a bus interval when in the first mode;
reading an endpoint descriptor of a second, different endpoint of the second device to determine the second, different endpoint supports a second service interval for the first mode that is smaller than a legacy service interval for the first mode; and scheduling a data transfer with the transceiver circuit for the second, different endpoint of the second device at the second service interval that is smaller than the first service interval when in the first mode.

18. The non-transitory machine readable medium of claim 17, the method further comprising scheduling a second class data transfer and the data transfer for the first endpoint within the first service interval.

19. The non-transitory machine readable medium of claim 17, the method further comprising scheduling a second class data transfer and the data transfer for the second, different endpoint within the second service interval.

20. The non-transitory machine readable medium of claim 17, the method further comprising setting the bus interval to about 125 microseconds.

21. The non-transitory machine readable medium of claim 17, wherein the endpoint descriptor of the second, different endpoint of the second device indicates the second service interval is a fraction of the bus interval.

22. The non-transitory machine readable medium of claim 17, the method further comprising guaranteeing bandwidth for the first class of data transfers, and not guaranteeing bandwidth for the second class of data transfers.

23. The non-transitory machine readable medium of claim 17, the method further comprising sending and receiving data with the transceiver circuit according to a Universal Serial Bus (USB) specification.

24. The non-transitory machine readable medium of claim 23, wherein the first mode is a USB periodic transfer mode and the second mode is a USB bulk transfer mode.

\* \* \* \* \*